United States Patent
Ashraf et al.

(10) Patent No.: US 11,290,983 B2
(45) Date of Patent: Mar. 29, 2022

(54) MULTI-STAGE SIDELINK CONTROL INFORMATION

(71) Applicant: Telefonaktiebolaget LM Ericsson (publ), Stockholm (SE)

(72) Inventors: Shehzad Ali Ashraf, Aachen (DE); Ricardo Blasco Serrano, Espoo (FI); Gabor Fodor, Hässelby (SE); Jingya Li, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 714 days.

(21) Appl. No.: 16/080,311

(22) PCT Filed: Apr. 5, 2018

(86) PCT No.: PCT/EP2018/058706
§ 371 (c)(1),
(2) Date: Aug. 28, 2018

(87) PCT Pub. No.: WO2019/192701
PCT Pub. Date: Oct. 10, 2019

(65) Prior Publication Data
US 2021/0204250 A1    Jul. 1, 2021

(51) Int. Cl.
*H04W 72/04* (2009.01)
*H04W 72/02* (2009.01)
(Continued)

(52) U.S. Cl.
CPC ....... *H04W 72/02* (2013.01); *H04W 72/0406* (2013.01); *H04W 72/0493* (2013.01); *H04W 72/10* (2013.01); *H04W 92/18* (2013.01)

(58) Field of Classification Search
CPC . H04W 72/02; H04W 72/0406; H04W 72/10; H04W 72/0493; H04W 92/18; H04W 4/46; H04W 72/042; H04W 84/18
See application file for complete search history.

(56) References Cited

U.S. PATENT DOCUMENTS

| | | | |
|---|---|---|---|
| 9,781,585 B2 | 10/2017 | Sheng | |
| 2013/0223352 A1* | 8/2013 | Sartori | H04W 72/121 370/329 |

(Continued)

FOREIGN PATENT DOCUMENTS

| | | |
|---|---|---|
| RU | 2643185 C1 | 1/2018 |
| RU | 2643349 C1 | 2/2018 |

(Continued)

OTHER PUBLICATIONS

International Search Report and Written Opinion of the International Searching Authority, PCT/EP2018/058706, dated Oct. 22, 2018, 12 pages.

(Continued)

*Primary Examiner* — Un C Cho
*Assistant Examiner* — Lalita W Pace
(74) *Attorney, Agent, or Firm* — Sage Patent Group

(57) ABSTRACT

A radio device receives first sidelink control information from a further radio device. Based on assistance information stored in the radio device and the received first sidelink control information, the radio device determines a configuration for transmission of second sidelink control information. Based on the determined configuration for transmission of the second sidelink control information, the radio device receives the second sidelink control information from the further radio device. Based on the received second sidelink control information, the radio device receives a sidelink radio transmission from the further radio device.

26 Claims, 8 Drawing Sheets

(51) Int. Cl.
*H04W 72/10* (2009.01)
*H04W 92/18* (2009.01)

(56) References Cited

U.S. PATENT DOCUMENTS

| | | | |
|---|---|---|---|
| 2014/0328329 | A1 | 11/2014 | Novlan et al. |
| 2016/0338095 | A1* | 11/2016 | Faurie ............... H04W 28/0278 |
| 2017/0041902 | A1 | 2/2017 | Sheng |
| 2017/0188391 | A1 | 6/2017 | Rajagopal et al. |
| 2018/0049084 | A1 | 2/2018 | Lee et al. |
| 2018/0049260 | A1 | 2/2018 | Aminaka et al. |
| 2018/0092022 | A1 | 3/2018 | Huang et al. |
| 2018/0146494 | A1* | 5/2018 | Khoryaev ............. H04W 76/15 |
| 2018/0206260 | A1* | 7/2018 | Khoryaev ......... H04W 72/1289 |
| 2019/0174530 | A1* | 6/2019 | Kim ...................... H04L 1/0025 |
| 2020/0021419 | A1* | 1/2020 | Taherzadeh Boroujeni ................ H04L 5/0091 |
| 2020/0163103 | A1* | 5/2020 | Kuang .................. H04W 72/04 |
| 2020/0305140 | A1* | 9/2020 | Song ................... H04W 72/042 |
| 2020/0322923 | A1* | 10/2020 | Yasukawa ............... H04W 4/44 |
| 2020/0389900 | A1* | 12/2020 | Lee .................. H04W 72/0493 |

FOREIGN PATENT DOCUMENTS

| | | |
|---|---|---|
| WO | WO 2015/026277 A1 | 2/2015 |
| WO | WO 2016/117940 A1 | 7/2016 |
| WO | WO 2016/142973 A | 9/2016 |
| WO | WO 2016/181095 A1 | 11/2016 |
| WO | WO 2016/186059 A | 11/2016 |
| WO | WO 17/065666 A1 | 4/2017 |
| WO | WO 17/148498 A1 | 9/2017 |
| WO | WO 17/171897 A1 | 10/2017 |
| WO | WO 2018/030775 A1 | 2/2018 |

OTHER PUBLICATIONS

3rd Generation Partnership Project; Technical Specification Group Radio Access Network; Evolved Universal Terrestrial Radio Access (E-UTRA); LTE physical layer; General description (Release 14), 3GPP TS 36.201 V14.1.0 (Mar. 2017) 15 pages.
3rd Generation Partnership Project; Technical Specification Group Services and System Aspects; Study on enhancement of 3GPP Support for 5G V2X Services (Release 15), 3GPP TR 22.886 V15.1.0 (Mar. 2017), 58 pages.
Argentinian Office Action for Patent Application No. NC2020/0012467 dated Jun. 17, 2021, 27 pages.
Indian Examination Report for Application No. 201847019675 dated Jun. 8, 2021, 6 pages.
English Translation of Russian Decision to Grant and Search Report for Application No. 2020135907 dated May 28, 2021, 14 pages.
Notice of Reasons for Rejection, Japanese Patent Application No. 2020-554223, dated Jan. 16, 2022, 12 pages.
Qualcomm Incorporated, "sPDCCH Designs for Shortened TTL," 3GPP TSG RAN WG1 #88b R1-1704987, Mar. 25, 2017, 14 pages.
Ericsson, "On 2-stge PSCCH-I design," 3GPP TSG RAN WG1 #94b R1-1811607, Sep. 28, 2018, 7 pages.

* cited by examiner

| | | |
|---|---|---|
| Configuration #1 | Use Case 1<br>PPPP 1<br>Unicast<br>SISO | Search Space 1<br>MCS 1<br>SCI Format 1<br>Aggregation Levels 1, 2, 4<br>RS Configuration 1<br>SBS Configuration 1 |
| Configuration #2 | Use Case 2<br>PPPP 2<br>Unicast<br>MIMO | Search Space 2<br>MCS 2<br>SCI Format 2<br>Aggregation Levels 1, 2<br>RS Configuration 2<br>SBS Configuration 2 |
| Configuration #3 | Use Case 3<br>PPPP 3<br>Broadcast<br>SISO | Search Space 3<br>MCS 3<br>SCI Format 2, 3<br>Aggregation Levels 4, 8, 16<br>RS Configuration 3<br>SBS Configuration 3 |
| Configuration #4 | Use Case 4<br>PPPP 4<br>Broadcast<br>MIMO | Search Space 4<br>MCS 4<br>SCI Format 4<br>Aggregation Levels 4, 8, 16<br>RS Configuration 4<br>SBS Configuration 4 |
| Configuration #5 | Use Case 5<br>PPPP 5<br>Unicast<br>SISO | Search Space 5, 6, 7<br>MCS 5<br>SS Priority (6, 5, 7)<br>SCI Format 5<br>Aggregation Levels 1, 2, 4<br>RS Configuration 5<br>SBS Configuration 5 |
| Configuration #6 | Use Case 6<br>PPPP 6<br>Unicast<br>MIMO | Search Space 8, 9<br>MCS 6<br>SS Priority (8, 9)<br>SCI Format 6<br>Aggregation Level 4<br>RS Configuration 6<br>SBS Configuration 6 |

MULTI-STAGE SIDELINK CONTROL INFORMATION

CROSS REFERENCE TO RELATED APPLICATIONS

This application is a 35 U.S.C. § 371 national stage application of PCT International Application No. PCT/EP2018/058706 filed on Apr. 5, 2018, the disclosure and content of which is incorporated by reference herein in its entirety.

TECHNICAL FIELD

The present invention relates to methods for controlling radio transmissions and to corresponding radio devices, systems, and computer programs.

BACKGROUND

In a wireless communication network a transmission direction from the wireless communication network to a UE (user equipment) is typically referred to as "downlink" (DL) direction, while a transmission direction from the UE to the wireless communication network is typically referred to as "uplink" (UL) direction. In addition to DL radio transmissions and UL radio transmissions, it is known to support direct radio transmissions between UEs. These direct radio transmissions may be referred to as "sidelink" (SL) radio transmissions. For example, in the case of the LTE (Long Term Evolution) radio technology specified by 3GPP (3$^{rd}$ Generation Partnership Project), SL radio transmissions are defined in 3GPP TS 36.201 V14.1.0 (2017 March). The SL radio transmissions may for example be used for V2X (vehicle-to-anything) communications, which may for example include: V2V (vehicle-to-vehicle) communications between vehicles; V2P (vehicle-to-pedestrian) communications between a vehicle and a device carried by an individual, e.g., a handheld terminal carried by a pedestrian, cyclist, driver, or passenger; V2I (vehicle-to-infrastructure) communications between a vehicle and a roadside unit (RSU) of traffic infrastructure, e.g., an entity transmitting speed limit notifications, and V2N (vehicle-to-network) communications between a vehicle and a node of the wireless communication network. As a general rule, V2X communications may utilize network infrastructure when available. However, at least basic V2X communication functionalities should also be possible without network infrastructure, e.g., outside network coverage.

In the LTE radio technology, SL radio transmissions are performed using a physical SL control channel (PSCCH) and a physical SL shared channel (PSSCH). The PSCCH carries SL control information (SCI) which may for example indicate scheduling information for a data transmission on the PSSCH. The SCI may indicate radio resources allocated for the data transmission of the PSSCH, a modulation and coding scheme (MCS) to be used for the data transmission of the PSSCH, a retransmission index, an intention to reserve the same radio resources for a future data transmission, and a priority level in terms of a PPPP (ProSe Per-Packet Priority). The PSCCH has a fixed size of two resource blocks (RBs) and is transmitted in the same sub-frame with the data transmission on the PSSCH.

In the LTE radio technology, a receiver of a SL radio transmission is typically unaware beforehand of the SL radio transmission. That is to say, the receiver cannot know with certainty whether a SL radio transmission is going to take place or not. Moreover, the receiver typically does not know the parameters used by the transmitter of the SL radio transmission. To simplify the receiver design the LTE radio technology requires that transmission of the SCI on the PSCCH can only be performed on certain predetermined radio resources and using predetermined transmission parameters, and that the transmission of the SCI on the PSCCH always uses the same format. The predetermined RBs on which the transmission of the SCI on the PSCCH transmission can take place are typically referred as a search space (SS). Using these assumptions, complexity of the SL receiver can be limited because it is typically only necessary to attempt to decode PSCCH transmissions in the search space, which is also referred to as blind decoding of the PSCCH or SCI.

However, introduction of new services or utilizations of SL radio communications in the LTE radio technology or a 5G (5$^{th}$ Generation) radio technology, may result in a variety of requirements in terms of latency, reliability, data rates, which cannot be met with the above limitations concerning SS, SCI format, and transmission parameters which may in turn lead to a higher complexity and power consumption of the SL receiver.

Accordingly, there is a need for techniques which allow for efficiently controlling SL radio communications.

SUMMARY

According to an embodiment, a method of controlling SL radio transmissions in a wireless communication network is provided. According to the method, a radio device receives first SCI from a further radio device. Based on assistance information stored in the radio device and the received first SCI, the radio device determines a configuration for transmission of second SCI. Based on the determined configuration for transmission of the second SCI, the radio device receives the second SCI from the further radio device. Based on the received second SCI, the radio device receives an SL radio transmission from the further radio device.

According to a further embodiment, a method of controlling SL radio transmissions in a wireless communication network is provided. According to the method, a radio device determines first SCI based on assistance information stored in the radio device. The assistance information relates the first SCI to a configuration for transmission of second SCI. The radio device sends the first SCI to a further radio device. Based on the configuration, the radio device further sends the second SCI to the further radio device. Based on the second SCI, the radio device sends an SL radio transmission to the further radio device.

According to a further embodiment, a method of controlling SL radio transmissions in a wireless communication network is provided. According to the method, assistance information is provided to a first radio device. Further, the assistance information is provided to a second radio device. Providing the assistance information to the first and second radio devices may be accomplished by a node of the wireless communication network. The assistance information relates first SCI, transmitted from the first radio device to the second radio device, to a configuration for transmission of second SCI from the first radio device to the second radio device.

According to a further embodiment, a radio device for a wireless communication network is provided. The radio device is configured to receive first SCI from a further radio device. Further, the radio device is configured to determine, based on assistance information stored in the radio device and the received first SCI, a configuration for transmission of second SCI. Further, the radio device is configured to receive, based on the determined configuration for transmission of the second SCI, the second SCI from the further radio device. Further, the radio device is configured to receive an SL radio transmission from the further radio device based on the received second SCI.

According to a further embodiment, a radio device for a wireless communication network is provided. The radio device comprises at least one processor and a memory containing instructions executable by said at least one processor, whereby the radio device is operative to receive first SCI from a further radio device; to determine, based on assistance information stored in the radio device and the received first SCI, a configuration for transmission of second SCI; to receive, based on the determined configuration for transmission of the second SCI, the second SCI from the further radio device; and to receive an SL radio transmission from the further radio device based on the received second SCI.

According to a further embodiment, a radio device for a wireless communication network is provided. The radio device is configured to determine first SCI based on assistance information stored in the radio device. The assistance information relates the first SCI to a configuration for transmission of second SCI. Further, the radio device is configured to send the first SCI to a further radio device. Further, the radio device is configured to send, based on the configuration, the second SCI to the further radio device. Further, the radio device is configured to send an SL radio transmission to the further radio device based on the second SCI.

According to a further embodiment, a radio device for a wireless communication network is provided. The radio device comprises at least one processor and a memory containing instructions executable by said at least one processor, whereby the radio device is operative to determine first SCI based on assistance information stored in the radio device. The assistance information relates the first SCI to a configuration for transmission of second SCI. By the instructions the radio device is further operative to send the first SCI to a further radio device; to send, based on the configuration, the second SCI to the further radio device; and to send an SL radio transmission to the further radio device based on the second SCI.

According to a further embodiment, a node for a wireless communication network is provided. The node is configured to provide assistance information to a first radio device. Further, the node is configured to provide the assistance information to a second radio device. The assistance information relates first SCI, transmitted from the first radio device to the second radio device, to a configuration for transmission of second SCI from the first radio device to the second radio device.

According to a further embodiment, a node for a wireless communication network is provided. The node comprises at least one processor and a memory containing instructions executable by said at least one processor, whereby the node is operative to provide assistance information to a first radio device and to a second radio device. The assistance information relates first SCI, transmitted from the first radio device to the second radio device, to a configuration for transmission of second SCI from the first radio device to the second radio device.

According to a further embodiment, a system is provided. The system comprises a first radio device and a second radio device. The first radio device and the second radio device store assistance information. The first radio device is configured to: based on the assistance information stored in the first radio device, determine first SCI relating the assistance information to a configuration for transmission of second SCI; send the first SCI to the second radio device; based on the configuration, send the second SCI to the second radio device; and based on the second SCI, send an SL radio transmission to the second radio device. The second radio device is configured to: receive the first SCI from the first radio device; based on the assistance information stored in the second radio device and the received first SIC, determine the configuration for transmission of the second SCI; based on the determined configuration for transmission of the second SCI, receive the second SCI from the first radio device; and based on the received second SCI, receive the SL radio transmission from the first radio device. The system may further comprise a node of a wireless communication network which is configured to provide the assistance information to the first radio device and/or to the second radio device.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to receive first SCI from a further radio device. Further, execution of the program code causes the radio device to determine, based on assistance information stored in the radio device and the received first SCI, a configuration for transmission of second SCI. Further, execution of the program code causes the radio device to receive, based on the determined configuration for transmission of the second SCI, the second SCI from the further radio device. Further, execution of the program code causes the radio device to receive an SL radio transmission from the further radio device based on the received second SCI.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to determine first SCI based on assistance information stored in the radio device. The first SCI relates the assistance information to a configuration for transmission of second SCI. Further, execution of the program code causes the radio device to send the first SCI to a further radio device.

Further, execution of the program code causes the radio device to send, based on the configuration, the second SCI to the further radio device. Further, execution of the program code causes the radio device to send an SL radio transmission to the further radio device based on the second SCI.

According to a further embodiment of the invention, a computer program or computer program product is provided, e.g., in the form of a non-transitory storage medium, which comprises program code to be executed by at least one processor of a node for a wireless communication network. Execution of the program code causes the node to provide assistance information to a first radio device. Further, execution of the program code causes the node to provide the assistance information to a second radio device. The assistance information relates first SCI, transmitted from the first radio device to the second radio device, to a configuration for transmission of second SCI from the first radio device to the second radio device.

Details of such embodiments and further embodiments will be apparent from the following detailed description of embodiments.

BRIEF DESCRIPTION OF THE DRAWINGS

FIG. 5 illustrates an example of assistance information as used according to an embodiment of the invention for controlling SL radio transmissions.

DETAILED DESCRIPTION OF EMBODIMENTS

Figure 1:
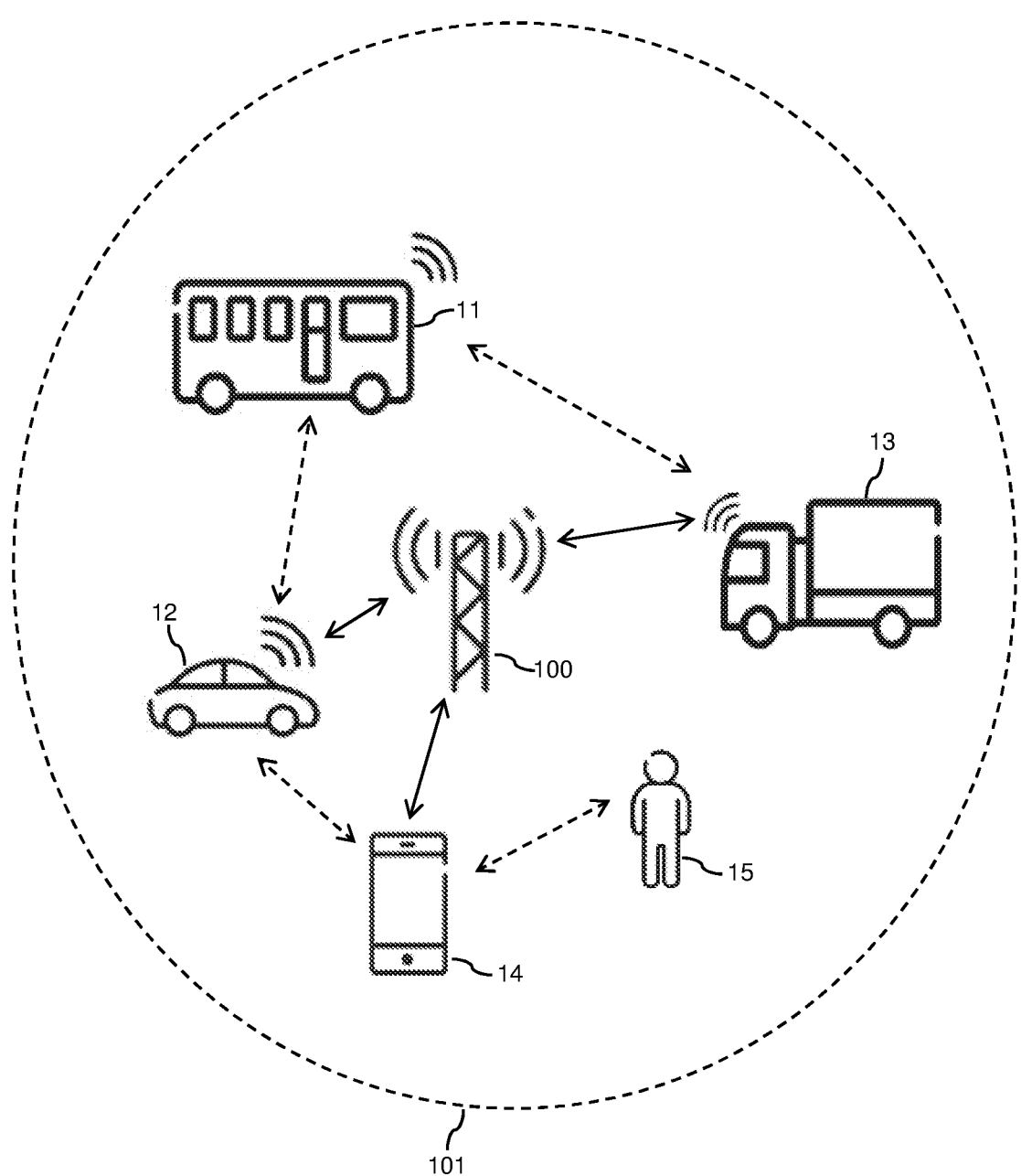
FIG. 1 shows an exemplary scenario for illustrating radio transmissions in a wireless communication network according to an embodiment of the invention.

In the following, concepts in accordance with exemplary embodiments of the invention will be explained in more detail and with reference to the accompanying drawings. The illustrated embodiments relate to controlling of SL radio transmissions in a wireless communication network. In the illustrated examples, it is assumed that the wireless communication network is based on the LTE radio technology. However, it is noted that other radio technologies supporting SL radio transmissions could be used as well, e.g., a 5G radio technology like the NR (New Radio) technology currently developed by 3GPP. As used herein, the term "transmission" is used to cover both aspects of sending and receiving.

In the illustrated examples, SCI for the SL radio transmissions between two radio devices, in the following referred to as UEs, is organized in a multi-stage way: first SCI, in the following also referred to as first stage SCI, and second SCI, in the following also referred to as second stage SCI. The first SCI and the second SCI may be sent in a dynamic manner for each SL radio transmission. The first SCI is used in connection with assistance information stored by the radio devices. The assistance information relates the first SCI to a configuration for transmission of the second SCI. The assistance information may be preconfigured in the UEs, e.g., based on a standard, may be signaled from the network to the UEs, e.g., as part of system information and/or using higher layer signaling like RRC (Radio Resource Control), or may be transferred from a first UE to a second UE, for example when the second UE enters a radio coverage area of the first UE.

Accordingly, a first UE which intends to send an SL radio transmission to a second UE may first select a suitable configuration for transmission of the second SCI. This selection may be use case dependent. For example, the selection may depend on whether the SL radio transmission is a unicast transmission or a broadcast transmission. Further, the selection may depend on a transmission mode of the SL radio transmission. For example, the selection may depend on whether the SL radio transmission uses a SISO (Single Input/Single Output) mode or a MIMO (Multiple Input/Multiple Output) mode. Further, the selection may depend on QoS (Quality of Service) requirements of the SL radio transmission, e.g., in terms of latency, data rate, reliability, or transmission range. Using the assistance information, the first UE may determine the first SCI which is related to the selected configuration and send the first SCI to the second UE. Based on the first SCI received from the first UE and the stored assistance information the second UE can determine the configuration for transmission of the second SCI. Accordingly, the first UE can then use the selected configuration for sending the second SCI to the second UE, and the second UE can use the selected configuration for receiving the second SCI from the first UE. Based on the second SCI, the first UE may then send the SL radio transmission to the second UE, and the second UE may receive the SL radio transmission. Accordingly, the assistance information and the first SCI allow for a high variability of the second SCI, enabling to support various use cases and requirements while limiting the blind decoding effort needed for the second SCI at the second UE.

FIG. 1 illustrates an exemplary scenario involving SL radio transmissions. More specifically, FIG. 1 shows an access node 100 of the wireless communication network, in the LTE radio technology referred to as eNB, and various entities 11, 12, 13, 14, 15 which may communicate by using DL radio transmissions and/or UL radio transmissions, illustrated by solid arrows, and SL radio transmissions, illustrated by broken arrows. A service area, or cell, of the access node is schematically illustrated by 101. The service area 101 may be defined by a radio coverage area in which DL radio transmissions from the access node 100 and UL radio transmissions to the access node 100 are possible. Here, it is noted that the wireless communication network may comprise further access nodes, each having a corresponding service area which may be overlapping or non-overlapping with the coverage area 101 of the access node 100.

The entities illustrated in FIG. 1 comprise vehicles 11, 12, 13, a mobile phone 14, and a person 15, e.g., a pedestrian, a cyclist, a driver of a vehicle, or a passenger of a vehicle. Here, it is noted that in the case of the vehicles 11, 12, 13 the radio transmissions may be performed by a communication module installed in the vehicle, and that in the case of the person 15 the radio transmissions may be performed by a radio device carried or worn by the person 15, e.g., a wristband device or similar wearable device. Those devices and modules may be also referred as UEs. The SL radio transmissions may be enabled by the DL radio transmissions and/or UL radio transmissions, e.g., by using DL radio transmissions from the access node 100 to control or otherwise manage the SL radio transmissions. As further explained below this may involve providing the above-mentioned assistance information to the radio devices and/or modules of the entities. Furthermore, it is noted that the entities shown in FIG. 1 are merely exemplary. The SL radio transmissions may be used for implementing various kinds of V2X communication, including V2V communication, V2P communication and/or V2I communication. Accordingly, the SL radio transmissions may carry various types of V2X messages, e.g., a cooperative awareness message (CAM) or a decentralized environmental notification message (DENM). However, other kinds of SL radio communication could be supported as well.

In accordance with assumed utilization of the LTE radio technology, the SL radio transmissions may be based on the PC5 interface as specified 3GPP TS 23.303 V14.1.0 (2016 December). The DL radio transmissions and the UL radio transmissions may be based on the LTE Uu interface as specified in 3GPP TS 23.401 V14.6.0 (2017 December). The SL radio transmissions may involve a data transmission on the PSSCH, and the first SCI and the second SCI may be transmitted on the PSCCH. Each data transmission on the PSSCH may be scheduled by first SCI and second SCI transmitted on the PSCCH. Transmission parameters of the SL radio transmissions, such as the number of utilized RBs, number of retransmissions, and/or the MCS can be adapted based on a priority level, e.g., defined in terms of a PPPP, congestion level of the utilized carrier, and movement speed of the transmitting radio device. As for example specified in 3GPP TS 23.303 V14.1.0, the PPPP is set on an application layer for each message transmitted over the PC5 interface.

The allocation of radio resources for a SL radio transmission may be performed in a centralized manner, using DL control information (DCI) which the access node 100 transmits to the radio device sending and/or receiving the SL radio transmission. In particular, for a certain SL radio transmission, the access node 100 may send DCI indicating allocated radio resources of the PSCCH to be used for transmission of the first SCI and the second SCI, and allocated radio resources of the PSSCH to be used for sending the actual data transmission.

Further, the allocation of radio resources for a SL radio transmission may be performed in a distributed or autonomous manner. In this case the sending radio device uses a specified algorithm to autonomously determine which radio resources to use for the SL radio transmission, for both the PSCCH and the PSSCH. The allocation of the radio resources may also be based on channel sensing performed by the sending radio device, e.g., in order to avoid collisions or other conflicts arising from multiple radio devices attempting to use the dame radio resources. The autonomously allocated radio resources may be selected from one or more resource pools. The resource pool(s) may be preconfigured, e.g., based on a standard, or signaled by the network, e.g., using system information or higher layer signaling, e.g., RRC signaling. The sensing-based autonomous allocation of the radio resources may for example be performed in accordance with "Mode 4" of SL radio transmission as specified in 3GPP TS 36.213 V14.5.0 (2017 December). In Mode 4, autonomous resource allocation makes combined use of two features: semi-persistent resource allocation and sensing-based resource allocation. The semi-persistent resource allocation involves allocation of the radio resources over an extended time interval, so that they can be re-used in a more or less regular manner. The sensing based allocation involves monitoring the radio channel to detect the presence of such regular transmissions by other devices. In this way, the UE can avoid collisions when selecting autonomously selecting the radio resources from a resource pool shared by multiple radio devices.

Figure 2:
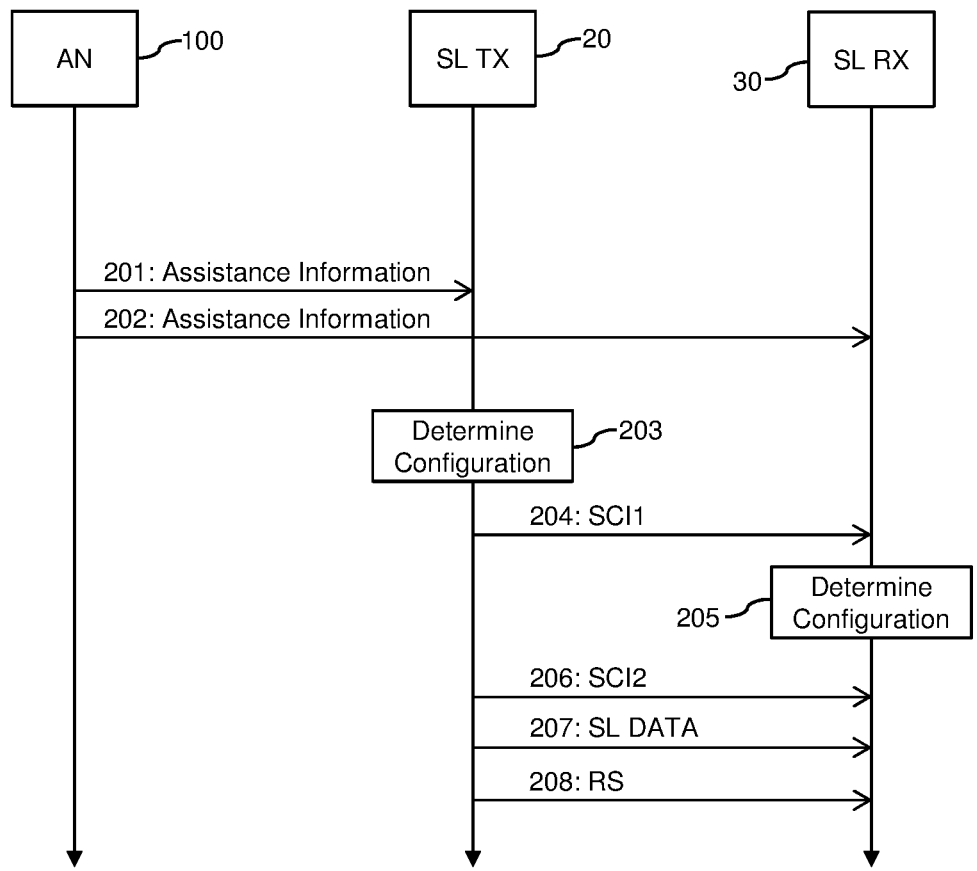
FIG. 2 illustrates an example of processes in which a SL radio transmission between radio devices is controlled according to an embodiment of the invention.

FIG. 2 shows an example of processes in which a SL radio transmission is controlled based on the principles as outlined above. The processes of FIG. 2 involve the access node (AN) 100, a sending UE (SL TX) 20, and a receiving UE (SL RX) 30. Here, it is noted that the sending UE 20 and the receiving UE 30 could correspond to any pair of the entities 11, 12, 13, 14, 15 illustrated in FIG. 1.

In the example of FIG. 2, it is assumed that the access node 100 first provides at least a part of the assistance information to the UEs 20, 30, as illustrated by messages 201 and 202. The assistance information is stored by the UEs 20, 30. The messages 201, 202 could for example be part of signaled system information and/or RRC messages. Another part of the assistance information could be preconfigured in the UEs 20, 30, e.g., based on a standard. In an alternative scenario, the assistance information could be completely preconfigured in the UEs 20, 30. It is noted that in the illustrated concepts it may also be possible that the assistance information stored by the UE 20 varies from the assistance information stored by the UE 30, e.g., because the UEs 20, 30 differ in UE type and/or supported functionalities. However, typically at least a part of the assistance information is common for the two UEs 20, 30, and this common part will be used for controlling the SL radio transmission as further explained below. As further explained below, the assistance information may for example be provided in terms of a configuration table.

As illustrated by block 203, the sending UE 20 then selects a configuration for transmission of the first stage SCI and the second stage SCI. The configuration for transmission of the first stage SCI may be preconfigured and be the same for all UEs in the wireless communication system. The configuration for transmission of the first stage SCI may define a search space for transmission of the first stage SCI, e.g., in terms of position in the time and frequency domain, an MCS for transmission of the first stage SCI, an aggregation level for transmission of the first stage SCI, and/or an SCI format of the first stage SCI. The aggregation level may be regarded as representing a number of control channel elements (CCEs), or amount of control channel radio resources, which is required for transmission of the SCI.

The determination of the second stage SCI involves a larger variability and may be based on a use case underlying the intended SL radio transmission or a type of the intended SL radio transmission, e.g., on the PPPP set by the application layer, on whether the intended SL radio transmission is a unicast transmission or a broadcast transmission, and/or on whether the SL radio transmission is intended to be performed in a SISO mode or in an MIMO mode. The configuration for transmission of the second stage SCI may define one or more search spaces for transmission of the second stage SCI, e.g., in terms of position in the time and frequency domain, one or more MCSs for transmission of the second stage SCI, one or more aggregation levels for transmission of the second stage SCI, and/or SCI format of the second stage SCI. The configuration for transmission of the second stage SCI can be selected from multiple possible candidate configurations and is typically different from the configuration for transmission of the first stage SCI. For example, the configuration for transmission of the second stage SCI may define other and larger search spaces, different aggregation levels and/or a more complex SCI format than the configuration for transmission of the first stage SCI. Further, the configuration for transmission of the second stage SCI may be set individually for each UE and/or for each SL radio transmission.

The sending UE 20 uses the stored assistance information to determine the first stage SCI which is related to the selected configuration. The first stage SCI could for example include an index pointing to the selected configuration. Further, the first stage SCI could include one or more transmission parameters which are associated with the selected configuration, e.g., the PPPP, an indicator whether the intended SL radio transmission is a unicast transmission or a broadcast transmission, and/or an indicator whether the SL radio transmission is intended to be performed in a SISO mode or in an MIMO mode. The first stage SCI may be limited to information which enables identification of the selected configuration, thereby allowing to transmit the first stage SCI with low complexity. As illustrated by message 204, the sending UE 20 then sends the first stage SCI to the receiving UE 30. As illustrated by message 206, the sending UE 20 also sends the second stage SCI to the receiving UE 30, which is accomplished on the basis of the configuration selected at block 203.

Having received the first stage SCI, the receiving UE 30 uses the assistance information to identify the configuration related to the first stage SCI. Based on the identified configuration, the receiving UE 30 receives the second SCI. By being able to identify the configuration used for transmission of the second stage SCI, complexity of receiving the second stage SCI can be reduced in a significant manner, e.g., by narrowing down the possible search space(s), possible MCSs, possible SCI formats, and/or possible aggregation levels. In some scenarios, the first stage SCI in combination with the assistance information may identify a search space and a set of candidate SCI formats for transmission of the second stage SCI. The receiving UE 30 may then perform blind decoding in the identified search space using the different candidate SCI formats. In some scenarios the first stage SCI in combination with the assistance information may also define the configuration for transmission of the second stage SCI to an extent that enables the receiving UE 30 to decode the second stage SCI without requiring any blind decoding. For example, the configuration could indicate the exact radio resources, MCS, SCI format, and aggregation level which are used for transmission of the second stage SCI.

As further illustrated in FIG. 2, the sending UE 20 further sends the SL radio transmission to the receiving UE 30. This may involve sending SL data 207 on the PUSSCH. Further, this may involve sending one or more reference symbols (RS) 208. The SL radio transmission is performed on the basis of information indicated in the second stage SCI. For example, the second stage SCI could indicate radio resources allocated for the SL radio transmission, an MCS of the SL radio transmission, and/or a priority level of the SL radio transmission, e.g., in terms of the PPPP. Further, the second stage SCI may indicate retransmission parameters of the SL radio transmission, e.g., whether the SL radio transmission includes an initial transmission of data or a retransmission of data or the number of retransmission attempts, and/or a redundancy version of retransmitted data. Further, the second stage SCI could also indicate whether there is a reservation of radio resources for a subsequent SL radio transmission from the sending UE 20 to the receiving UE 30.

As mentioned above, the sending UE 20 may send one or more reference symbols 208. The sending of the reference symbols 208 may be controlled by the second stage SCI, thereby allowing usage of different configurations of reference symbols, while at the same time allowing for efficient monitoring of the reference symbols by the receiving UE 30. The reference symbols 208 may for example be used as a basis for performing sensing based scheduling of SL radio transmissions.

It is noted that while FIG. 2 illustrates the transmission of the first stage SCI to occur before the transmission of the second stage SCI, and the transmission of the second stage SCI to occur before the SL radio transmission, this does not need to be the case. For example, the first stage SCI, the second stage SCI, and the SL radio transmission could be transmitted substantially at the same time, e.g., on different RBs in the same subframe. The receiving UE 30 may monitor all possible RBs of the subframe and use the first stage SCI to reduce complexity of blind decoding of the second stage SCI. The decoded second stage SCI may then be used for decoding the SL data 207 and/or for monitoring the reference symbols 208. That is to say, while the second stage SCI can be transmitted using a configuration selected from a wide range of candidate configurations, the first stage SCI in combination with the assistance information allows for narrowing down the blind decoding performed by the receiving UE 30 to a single configuration or at least a limited subset of the candidate configurations.

Figure 3A:
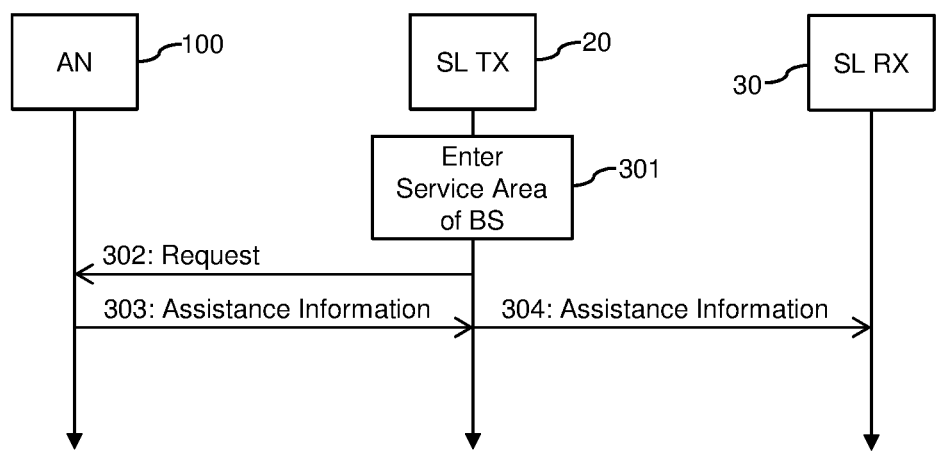
FIG. 3A illustrates an example of processes for providing assistance information to the radio devices.

FIG. 3A shows an example of processes which may be used to provide the sending UE 20 and the receiving UE 30 with the assistance information. In the processes of FIG. 3A, it is assumed that the sending UE 20 enters the service area 101 of the access node 100, as indicated by block 301. The receiving UE 30 may be outside the service area 101 of the access node 100, or may have previously entered the coverage area 101 of the access node 100.

As further illustrated, in response to entering the service area 101 of the access node 100, the sending UE 20 sends a request 302 to the access node 100. The request 302 could for example be send in a message of a procedure used for setting up a connection between the sending UE 20 and the access node 100. In response to the request 302, the access node 100 sends assistance information 303 to the sending UE 20. The sending UE 20 stores the received assistance information 303. If previously stored assistance information is available in the sending UE 20, the sending UE 20 may use the received assistance information 303 for replacing or updating the previously stored assistance information.

As further illustrated, the sending UE 20 may also send assistance information 304 to the receiving UE 30. The assistance information 304 may correspond to at least a part of the assistance information 303 received by the sending UE 20, which is forwarded to the receiving UE 30. Further, the sending UE 20 could also forward at least a part of assistance information previously stored by the sending UE 20 to the receiving UE 30. The sending of the assistance information 304 could for example be part of an SL discovery procedure, e.g., a ProSe discovery procedure as specified in 3GPP TS 23.303 V14.1.0. The receiving UE 30 stores the received assistance information 304. If previously stored assistance information is available in the receiving UE 30, the receiving UE 30 may use the received assistance information 303 for replacing or updating the previously stored assistance information.

Figure 3B:
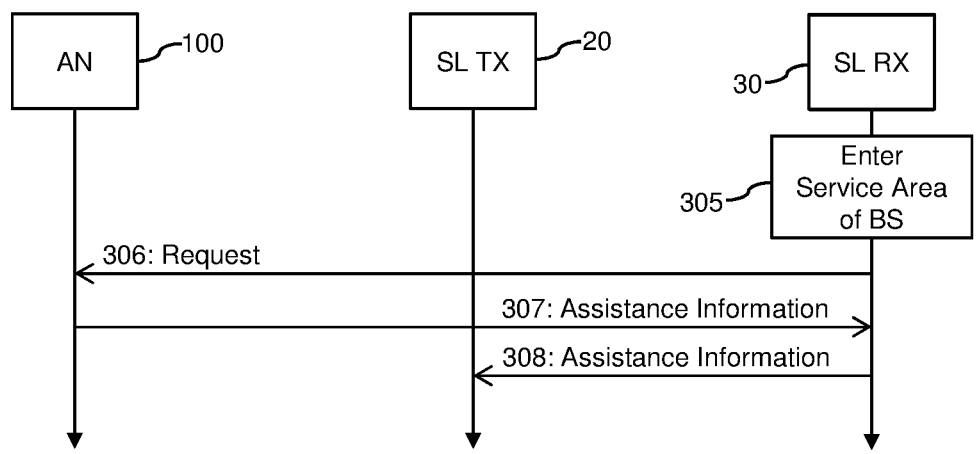
FIG. 3B illustrates a further example of processes for providing assistance information to the radio devices.

FIG. 3B shows a further example of processes which may be used to provide the sending UE 20 and the receiving UE 30 with the assistance information. In the processes of FIG. 3B, it is assumed that the receiving UE 30 enters the service area 101 of the access node 100, as indicated by block 305.

The sending UE 20 may be outside the service area 101 of the access node 100, or may have previously entered the coverage area 101 of the access node 100.

As further illustrated, in response to entering the service area 101 of the access node 100, the receiving UE 30 sends a request 306 to the access node 100. The request 306 could for example be send in a message of a procedure used for setting up a connection between the receiving UE 30 and the access node 100. In response to the request 306, the access node 100 sends assistance information 307 to the receiving UE 30. The receiving UE 30 stores the received assistance information 307. If previously stored assistance information is available in the receiving UE 30, the receiving UE 30 may use the received assistance information 307 for replacing or updating the previously stored assistance information.

As further illustrated, the receiving UE 30 may also send assistance information 308 to the sending UE 20. The assistance information 308 may correspond to at least a part of the assistance information 307 received by the receiving UE 30, which is forwarded to the sending UE 30. Further, the receiving UE 30 could also forward at least a part of assistance information previously stored by the receiving UE 30 to the sending UE 20. The sending of the assistance information 308 could for example be part of an SL discovery procedure, e.g., a ProSe discovery procedure as specified in 3GPP TS 23.303 V14.1.0. The sending UE 20 stores the received assistance information 308. If previously stored assistance information is available in the sending UE 20, the sending UE 20 may use the received assistance information 308 for replacing or updating the previously stored assistance information.

Figure 3C:
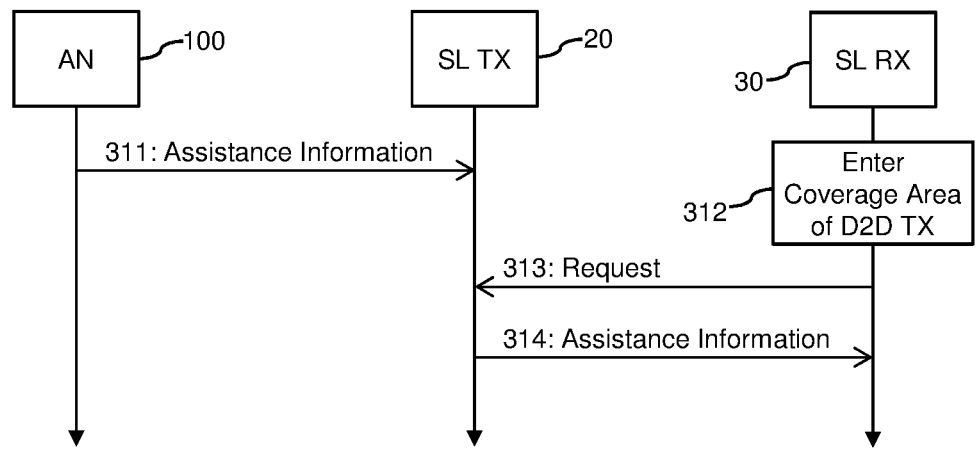
FIG. 3C illustrates a further example of processes for providing assistance information to the radio devices.

FIG. 3C shows a further example of processes which may be used to provide the sending UE 20 and the receiving UE 30 with the assistance information. In the processes of FIG. 3C, the access node 100 first sends assistance information 311 to the sending UE 20. The sending UE 20 stores the received assistance information 311. If previously stored assistance information is available in the sending UE 20, the sending UE 20 may use the received assistance information 311 for replacing or updating the previously stored assistance information.

In the processes of FIG. 3C, it is further assumed that the receiving UE 30 then enters a radio coverage area of the sending UE 20, as indicated by block 312. At that point, the receiving UE 30 may be outside the service area 101 of the access node 100, so that obtaining assistance information directly from the access node 100 is not possible.

As further illustrated, in response to entering the radio coverage area of the sending UE 20, the receiving UE 30 sends a request 313 to the sending UE 20. The request 313 could for example be part of an SL discovery procedure, e.g., a ProSe discovery procedure as specified in 3GPP TS 23.303 V14.1.0. In response to the request 313, the sending UE 20 sends assistance information 314 to the receiving UE 30. The assistance information 314 may correspond to at least a part of the assistance information 311 received by the sending UE 20, which is forwarded to the receiving UE 30. Further, the sending UE 20 could also forward at least a part of assistance information previously stored by the sending UE 20 to the receiving UE 30. The receiving UE 30 stores the received assistance information 314. If previously stored assistance information is available in the receiving UE 30, the receiving UE 30 may use the received assistance information 307 for replacing or updating the previously stored assistance information.

Figure 4:
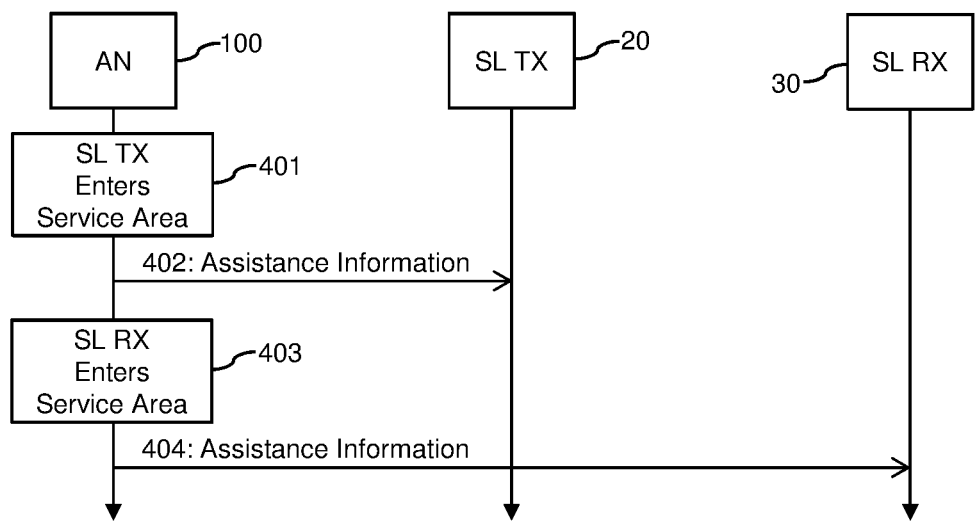
FIG. 4 illustrates a further example of processes for providing assistance information to the radio devices.

FIG. 4 shows a further example of processes which may be used to provide the sending UE 20 and the receiving UE 30 with the assistance information. In the processes of FIG. 4, it is assumed that the sending UE 20 enters the service area 101 of the access node 100. As indicated by block 401, the access node 100 may detect that the sending UE 20 entered the service area 101 of the access node 100, e.g., based on the sending UE 20 setting up a connection to the access node 100.

As further illustrated, in response to the sending UE 20 entering the service area 101 of the access node 100, the, the access node 100 sends assistance information 402 to the sending UE 20. The sending UE 20 stores the received assistance information 402. If previously stored assistance information is available in the sending UE 20, the sending UE 20 may use the received assistance information 402 for replacing or updating the previously stored assistance information.

In the processes of FIG. 4, it further assumed that at some point the receiving UE 30 enters the service area 101 of the access node 100. As indicated by block 403, the access node 100 may detect that the receiving UE 30 entered the service area 101 of the access node 100, e.g., based on the receiving UE 20 setting up a connection to the access node 100.

As further illustrated, in response to the receiving UE 20 entering the service area 101 of the access node 100, the, the access node 100 sends assistance information 404 to the sending UE 20. The receiving UE 20 stores the received assistance information 404. If previously stored assistance information is available in the receiving UE 20, the sending UE 20 may use the received assistance information 402 for replacing or updating the previously stored assistance information.

As can be seen, in the example of FIG. 4 no explicit request from the sending UE 20 or the receiving UE 30 is needed for triggering the sending of the assistance information 402, 404 by the access node 100. Furthermore, it is also noted that in some scenarios the detection of the sending UE 20 or the receiving UE 30 entering the service area 100 and one of the access node 100 could also be omitted. For example, the access node 100 could broadcast the assistance information 402, 404, e.g., as part of system information, so that the assistance information 402, 404.

It is noted that the processes of FIGS. 3A, 3B, 3C, and 4 are merely exemplary and could be modified and/all combined in various ways in order to provide the assistance information to the sending UE 20 and to the receiving UE 30. For example, similar to the processes of FIG. 3C, the sending UE 20 could request the assistance information from the receiving UE 30 in response to the sending UE 20 entering a radio coverage area of the receiving UE 30.

FIG. 5 shows an example of organizing the assistance information in terms of a configuration table 500. The configuration table 500 includes a plurality of rows, each corresponding to a different candidate configuration for the transmission of the second stage SCI. As indicated by the left column of the configuration table 500, each candidate configuration may be identified by an index. In the illustrated example a first candidate configuration is identified by index 1, a second candidate configuration is identified by index 2, a third candidate configuration is identified by index 3, a fourth candidate configuration is identified by index 4, a fifth candidate configuration is identified by index 5, and a sixth candidate configuration is identified by index 6. However, it is noted that the illustrated number of candidate configurations is merely exemplary and that the assistance information could also define a higher or lower number of candidate configurations.

As illustrated by the middle column of the configuration table 500, each of the different candidate configurations may be associated with a certain use case. The use cases may differ with respect to reliability requirements, e.g., represented by different PPPPs assigned to the SL radio transmissions. For example, a safety related use case may involve transmission of emergency messages or hazard warnings and may involve assigning a high priority level to the SL radio transmissions. On the other hand, use case which is not safety related may involve transmission of traffic information messages and may involve assigning a lower priority level to the SL radio transmissions. In the example of FIG. 5, the different priority levels are represented by different PPPPs. As further illustrated by the middle column of the configuration table 500, the use cases may also differ with respect to a transmission scenario, e.g., depending on whether the SL radio transmissions are unicast transmissions or broadcast transmissions. As further illustrated by the middle column of the configuration table 500, the use cases may also differ with respect to a transmission mode, e.g., depending on whether the SL radio transmissions are performed in a SISO mode or in a MIMO mode.

The right column of the configuration table indicates the parameters of the configuration for transmission of the second stage SCI. As illustrated, these parameters may indicate one or more search spaces for transmission of the second stage SCI, e.g., defined in terms of RBs and/or subframe(s), one or more MCSs for transmission of the second stage SCI, one or more aggregation levels for transmission of the second stage SCI, and/or SCI format of the second stage SCI. Further, the parameters may indicate a reference symbol (RS) configuration, or a sensing based scheduling (SBS) configuration.

By having the use case dependent configurations, it is for example possible to define a configuration for a use-case requiring high reliability, e.g., transmission of emergency messages or hazard warnings, which involves using a small-sized SCI format for the second stage SCI and/or a higher aggregation level, thereby ensuring reliable transmission of the second stage SCI, which increases reliability of the SL radio transmission itself. On the other hand, if a use case requires less reliability, e.g., transmission of traffic information, a configuration can be defined which involves using larger size SCI format and/or lower aggregation level. Similarly, one SCI format may be used for transmissions in SISO mode while another SCI format may be used transmissions in MIMO mode.

It is noted that while the parameters of the configuration as shown in FIG. 5 typically differ between the different configurations, there may also be an overlap of the parameters. For example, two or more of the SCI formats (SCI format 1, SCI format 2, SCI format 3, SCI format 4, SCI format 5, SCI format 6) could be the same. Further, they could also be a partial or full overlap of two or more of the different search spaces (Search Space 1, Search Space 2, Search Space 3, Search Space 4, Search Space 5, Search Space 6, Search Space 7, Search Space 8, Search Space 9).

As further illustrated, at least some of the configurations may also include sub-configurations. For example, such sub-configurations could correspond to the configuration defining multiple candidate search spaces, like shown for the fifth configuration and the sixth configuration of the example of FIG. 5. Further, such sub-configurations could correspond to the configuration defining multiple candidate aggregation levels, like shown for the first to fifth configuration of the example of FIG. 5. Further, such sub-configurations could correspond to the configuration defining multiple candidate SCI formats, like shown for the third configuration of the example of FIG. 5.

As further illustrated, if a configuration defines sub-configurations, the configuration may also define a priority order of the sub-configurations. For example, in the case of the fifth and sixth configuration, which define sub-configurations corresponding to different candidate search spaces, the configuration also defines a search space priority (SS priority). In the case of the fifth configuration, Search Space 6 is defined to have the highest priority, followed by Search Space 5, and then by Search Space 7. Accordingly, the receiving UE 30 will first perform blind decoding in Search Space 6, and if sufficient blind decoding capacity remains in Search Space 5, and if there is still sufficient remaining blind decoding capacity in Search Space 7. In the case of the sixth configuration, Search Space 8 is defined to have the highest priority, followed by Search Space 9. Accordingly, the receiving UE 30 will perform blind decoding in Search Space 8, and if sufficient blind decoding capacity remains in Search Space 9. In some scenarios, the decision whether to attempt blind decoding in a certain search space may also depend on the speed of the receiving UE 30. For example, the receiving UE 30 could decide to refrain from attempting blind decoding in one of the lower priority search spaces if the receiving UE 30 moves at high speed, resulting in a degradation of transmission performance in the lower priority search space.

In some scenarios, the configurations may also define different search spaces, aggregation levels, and/or SCI formats for the transmission of different types of SCI. By way of example, the wireless communication system could supporting the following functionalities: (A) scheduling, involving transmission of SCI of a first type that is necessary to decode a data transmission; (B) resource booking, involving transmission of SCI of a second type that notifies the intention of the sending UE 20 to use certain radio resources at a later point in time; (C) resource unbooking, involving transmission of SCI of a third type that notifies the intention of the sending UE 20 to release previously booked radio resources, and (D) resource pre-emption involving, transmission of SCI of a fourth type that notifies the receiving UE 30 that it should refrain from using previously booked radio resources. For each of the above-mentioned types of SCI, a different configuration for transmission of the second stage SCI may be defined, e.g., differing with respect to search space(s), aggregation level(s), and/or SCI format. For example, in the case of the first type of SCI and the second type of SCI, the configuration for transmission of the second stage SCI may define using a first search space, e.g., corresponding to the first OFDM (Orthogonal Frequency Division Multiplexing) symbols in a group of OFDM symbols or slot), whereas the in the case of the third type of SCI and the fourth type of SCI, the configuration for transmission of the second stage SCI may define using in a second search space, e.g., corresponding to using later OFDM symbols in the group or slot. On the side of the receiving UE 30, the functionalities may be supported to different extent. For example, the receiving UE 30 could support only the scheduling and the resource booking. In this case, the receiving UE 30 could attempt decoding the second stage SCI only in the first search space. On the other hand, if the receiving UE 30 supports the above-mentioned functionalities (A) to (D) to full extent, it could attempt decoding the second stage SCI in both the first search space and the second search space.

It is noted that the above-mentioned different functionalities are merely an example and that similar different types of SCI may also be defined with respect to other functionalities.

In some scenarios, the SCI format(s) used in the second stage SCI may also be designed to facilitate backwards compatibility. This may be achieved by defining one or more information fields which are common to all SCI formats and to define future SCI formats by supplementing one or more additional information fields. The common information field(s) may be arranged in the first bits of the SCI format, and the additional information field(s) may be arranged in later bits of the SCI format. The common information fields indicate information like allocated radio resources, resource reservation, priority level. The receiving UE 30 may utilize the information indicated by the common information fields for controlling selection of radio resources for a presently received SL radio transmission and/or a subsequent SL radio transmission, e.g., in terms of allocation of radio resources, reservation of radio resources, reselection of radio resources, or pre-emption of radio resources.

Accordingly, in some scenarios the multi-stage SCI of the illustrated concepts may also be used for facilitating backwards compatibility. For example, legacy UEs and more advanced UEs could coexist in the wireless communication network. In this case, the first stage SCI may utilize in SCI format which is supported by both the legacy UEs and the more advanced UEs.

Similarly, also the second stage SCI may utilize one or more SCI formats which are supported by both the legacy UEs and the more advanced UEs. However, the second stage SCI could also utilize one or more SCI formats which are not fully supported by the legacy UEs. These SCI formats may define one or more common information fields which are supported by the legacy UEs, and one or more additional information fields, which are only supported by the more advanced UEs. The common information fields thus support all functionalities of the legacy UEs and ensure backwards compatibility. The additional information fields may be introduced to support enhanced functionalities of the more advanced UEs. If the sending UE 20 corresponds to a more advanced UE, it can send the second stage SCI with the common information field(s) and the additional information field(s). If the receiving UE 30 in turn corresponds to a legacy UE, it can receive the common information field(s) of the second stage SCI and ignore the additional information field(s) of the second stage SCI.

As mentioned above, the second stage SCI may indicate information concerning allocation of radio resources for an SL radio transmission. The radio resources may be scheduled in a centralized manner, i.e., the selected on the basis of scheduling information in DCI from the access node 100. However, in other scenarios the radio resources for the SL radio transmission may also be allocated in an autonomous manner by the sending UE 20. This may involve channel sensing by the sending UE 20, i.e., be based on a sensing-based scheduling mechanism. Accordingly, the second stage SCI could also indicate information for performing the sensing-based scheduling. However, in some cases all information needed for performing the sensing-based scheduling. e.g., allocated radio resources and/or priority level, could also be included in the first stage SCI.

The SCI used in the illustrated concepts may be protected by an error detection code, e.g., a CRC (cyclic redundancy check) code or similar redundancy check code for verifying integrity of the transmitted SCI. In this case, it is possible to protect the first stage SCI with a first error detection code and to protect the second stage SCI with a second error detection code, e.g., to use a separate error detection code for each stage of the SCI. However, in view of resource efficiency, also a common error detection code for both the first stage SCI and the second stage SCI could be used. In this case, the common error detection code could be carried by the first stage SCI, by the second stage SCI, or by both the first stage SCI and the second stage SCI. If the common error detection code is transmitted by both the first stage SCI and the second stage SCI, a first part of the error detection code could be transmitted in the first stage SCI, and a second part of the error detection code could be transmitted in the second stage SCI, and the first part and the second part of the error detection code could be concatenated by the receiving UE 30.

Figure 6:
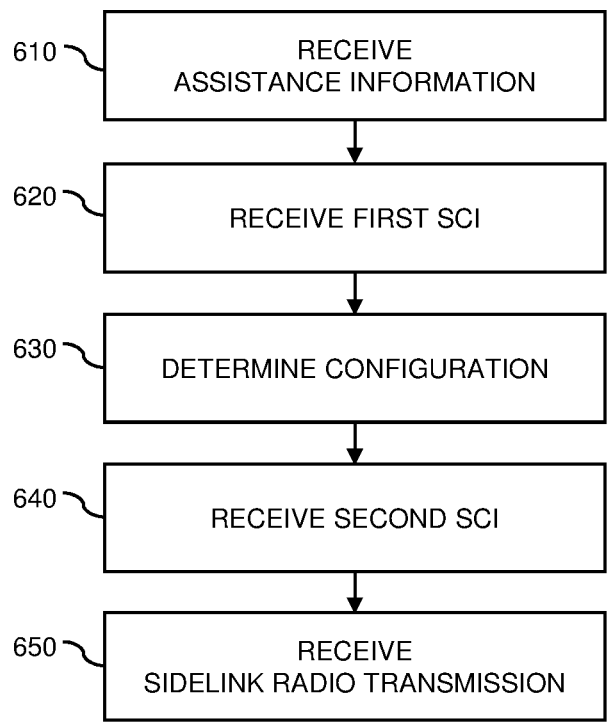
FIG. 6 shows a flowchart for schematically illustrating a method of controlling receiving of SL radio transmissions according to an embodiment of the invention.

FIG. 6 shows a flowchart for illustrating a method of controlling SL radio transmissions, which may be utilized for implementing the illustrated concepts. The method of FIG. 6 may be used for implementing the illustrated concepts in a radio device which receives an SL radio transmission from a further radio device. For example, the radio device could correspond to the above-mentioned receiving UE 30, and the further radio device could correspond to the above-mentioned sending UE 20. The SL radio transmission may include a transmission on a data channel, such as the above-mentioned transmission of SL data 207. Alternatively or in addition, the SL radio transmission may include a transmission of one or more reference signals, such as the above-mentioned transmission of reference symbols 208.

If a processor-based implementation of the radio device is used, at least some of the steps of the method of FIG. 6 may be performed and/or controlled by one or more processors of the radio device. Such radio device may also include a memory storing program code for implementing at least some of the below described functionalities or steps of the method of FIG. 6.

At step 610, the radio device may receive assistance information. The radio device may receive at least a part of the assistance information from a node of the wireless communication network, such as the above-mentioned access node 100. This may for example be accomplished in response to the radio device entering a service area of the node, such as explained in connection with the processes of FIG. 3B or FIG. 4. Alternatively or in addition, the radio device may receive at least a part of the assistance information from the further radio device, such as explained in connection with the processes of FIG. 3A or FIG. 3C. In the latter case, the radio device may receive the at least part of the assistance information in response to the radio device entering a radio coverage area of the further radio device, such as explained in connection with the processes of FIG. 3C. The radio device may request the assistance information from the node and/or the further radio device. That is to say, the radio device may receive the at least part of the assistance information in response to a request from the radio device, such as explained in connection with the processes of FIG. 3B or FIG. 3C. The radio device may then store the received assistance information for later usage.

At step 620, the radio device receives first SCI from the further radio device, such as the above-mentioned first stage SCI 204. In some scenarios, the first SCI may also include information for sensing-based allocation of radio resources for the SL radio transmission, e.g., information defining a resource pool from which the radio resources can be located by the sensing-based allocation mechanism and/or information defining one or more radio channels to be monitored by the sensing-based allocation mechanism.

At step 630, the radio device determines a configuration for transmission of second SCI, such as the above-mentioned second stage SCI 206. This determination is accomplished based on assistance information stored in the radio device. This assistance information may at least in part correspond to the assistance information received at step 610. Further, the determination of step 630 is based on the first SCI received at step 620.

In some scenarios, a first part of the configuration for transmission of the second SCI information may be defined by the first SCI and a second part of the configuration for transmission of the second SCI may be defined by the assistance information. For example, the assistance information may include one or more parameters defining the configuration, which in turn allow for implicitly deriving further parameters of the configuration. Examples of such parameters are the above-mentioned PPPP, the above-mentioned indicator whether the intended SL radio transmission is a unicast transmission or a broadcast transmission, and/or the above-mentioned indicator whether the SL radio transmission is intended to be performed in a SISO mode or in an MIMO mode, e.g., parameters as for example shown in the middle column of the configuration table of FIG. 5.

The assistance information may define multiple candidate configurations for transmission of the second SCI. In this case the first SCI may identify the configuration for transmission of the second SCI among the candidate configurations. For example, the first SCI could include an index identifying the configuration for transmission of the second SCI among the candidate configurations, such as the configuration index explained in connection with FIG. 5. However, it is noted that the first SCI could also include other information which may be used for implicitly identifying the configuration, such as the PPPP, an indicator whether the intended SL radio transmission is a unicast transmission or a broadcast transmission, and/or an indicator whether the SL radio transmission is intended to be performed in a SISO mode or in an MIMO mode, e.g., parameters as for example shown in the middle column of the configuration table of FIG. 5.

The configuration for transmission of the second SCI may define radio resources forming a search space for transmission of the second SCI. In some scenarios, the configuration for transmission of the second SCI may also define radio resources forming multiple search spaces for transmission of the SCI. In this case, the configuration may also define a priority order of the multiple search spaces.

The configuration for transmission of the second SCI may also define one or more formats for transmission of the second SCI, such as the above-mentioned SCI formats. When defining multiple formats, the configuration may also define a priority order of these multiple formats. In addition or as an alternative, the configuration for transmission of the second SCI may also define one or more one or more aggregation levels for transmission of the second SCI. When defining multiple aggregation levels, the configuration may also define a priority order of these multiple aggregation levels. In addition or as an alternative, the configuration for transmission of the second SCI may also define one or more modulation and/or coding schemes for transmission of the second SCI. When defining multiple modulation and/or coding schemes, the configuration may also define a priority order of these multiple modulation and/or coding schemes.

At step 640, the radio device receives the second SCI from the further radio device. This is accomplished based on the configuration determined at step 630.

The second SCI may include information indicating at least one of: radio resources to be used for the SL radio transmission, an modulation and/or coding scheme to be used for the SL radio transmission, one or more retransmission parameters of the SL radio transmission, and a priority level of the SL radio transmission. The radio resources can be indicated in terms of time/frequency location and/or in terms of a resource reservation.

In some scenarios, at least one of the first SCI and the second SCI includes a common error detection code for checking integrity of both the first SCI and the second SCI. Based on the common error detection code, the radio device may perform a single integrity check to find out whether the first SCI and the second SCI were correctly received by the radio device.

At step 650, the radio device receives the SL radio transmission from the further radio device. This is accomplished based on the second SCI received at step 640.

Figure 7:
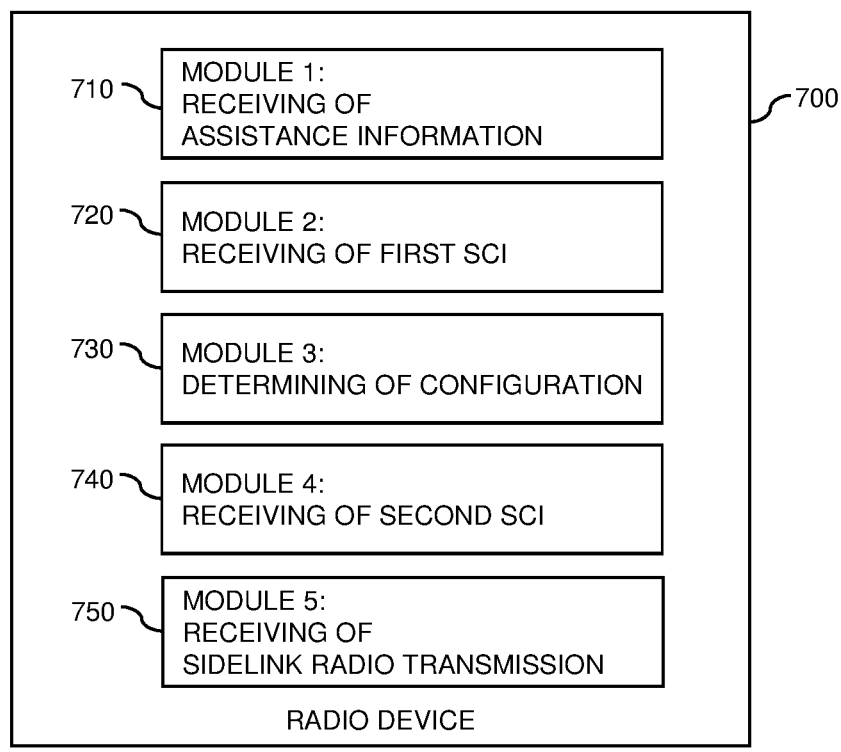
FIG. 7 shows a block diagram for illustrating functionalities of a receiving radio device according to an embodiment of the invention.

FIG. 7 shows a block diagram for illustrating functionalities of a radio device 700 which operates according to the method of FIG. 6. The radio device 700 may for example correspond to the above-mentioned receiving UE 30. As illustrated, the radio device 700 may optionally be provided with a module 710 configured to receive assistance information, such as explained in connection with step 610. Further, the radio device 700 may be provided with a module 720 configured to receive first SCI, such as explained in connection with step 620. Further, the radio device 700 may be provided with a module 730 configured to determine a configuration for transmission of second SCI, such as explained in connection with step 630. Further, the radio device 700 may be provided with a module 740 configured to receive the second SCI, such as explained in connection with step 640. Further, the radio device 700 may be provided with a module 750 configured to receive the SL radio transmission, such as explained in connection with step 650.

It is noted that the radio device 700 may include further modules for implementing other functionalities, such as known functionalities of a UE supporting V2X or other types of SL communication. Further, it is noted that the modules of the radio device 700 do not necessarily represent a hardware structure of the radio device 700, but may also correspond to functional elements, e.g., implemented by hardware, software, or a combination thereof.

Figure 8:
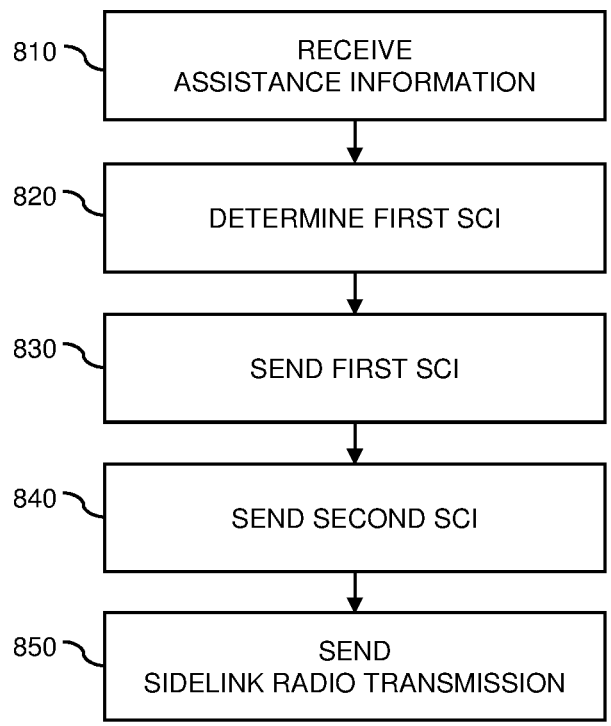
FIG. 8 shows a flowchart for schematically illustrating a method of controlling sending of SL radio transmissions according to an embodiment of the invention.

FIG. 8 shows a flowchart for illustrating a method of controlling SL radio transmissions, which may be utilized for implementing the illustrated concepts. The method of FIG. 8 may be used for implementing the illustrated concepts in a radio device which sends an SL radio transmission to a further radio device. For example, the radio device could correspond to the above-mentioned sending UE 20, and the further radio device could correspond to the above-mentioned receiving UE 30. The SL radio transmission may include a transmission on a data channel, such as the above-mentioned transmission of SL data 207. Alternatively or in addition, the SL radio transmission may include a transmission of one or more reference signals, such as the above-mentioned transmission of reference symbols 208.

If a processor-based implementation of the radio device is used, at least some of the steps of the method of FIG. 8 may be performed and/or controlled by one or more processors of the radio device. Such radio device may also include a memory storing program code for implementing at least some of the below described functionalities or steps of the method of FIG. 8.

At step 810, the radio device may receive assistance information. The radio device may receive at least a part of the assistance information from a node of the wireless communication network, such as the above-mentioned access node 100. This may for example be accomplished in response to the radio device entering a service area of the node, such as explained in connection with the processes of FIG. 3A or FIG. 4. Alternatively or in addition, the radio device may receive at least a part of the assistance information from the further radio device, such as explained in connection with the processes of FIG. 3B. In the latter case, the radio device may receive the at least part of the assistance information in response to the radio device entering a radio coverage area of the further radio device. The radio device may request the assistance information from the node and/or from the further radio device. That is to say, the radio device may receive the at least part of the assistance information in response to a request from the radio device, such as explained in connection with the processes of FIG. 3A. The radio device may then store the received assistance information for later usage.

At step 820, the radio device determines first SCI, such as the above-mentioned first stage SCI 204. The assistance information relates the first SCI to a configuration for transmission of second SCI. such as the above-mentioned second stage SCI 206. This determination is accomplished based on assistance information stored in the radio device. This assistance information may at least in part correspond to the assistance information received at step 810.

The determination of step 820 may involve that the radio device first determines the configuration, e.g., depending on a use case involving the transmission of the SL radio transmission or a type of the SL radio transmission. The radio device may then select the second SCI in such a way that it allows for identifying the configuration based on the stored assistance information.

In some scenarios, a first part of the configuration for transmission of the second SCI information may be defined by the first SCI and a second part of the configuration for transmission of the second SCI may be defined by the assistance information. For example, the assistance information may include one or more parameters defining the configuration, which in turn allow for implicitly deriving further parameters of the configuration. Examples of such parameters are the above-mentioned PPPP, the above-mentioned indicator whether the intended SL radio transmission is a unicast transmission or a broadcast transmission, and/or the above-mentioned indicator whether the SL radio transmission is intended to be performed in a SISO mode or in an MIMO mode, e.g., parameters as for example shown in the middle column of the configuration table of FIG. 5.

The assistance information may define multiple candidate configurations for transmission of the second SCI. In this case the first SCI may identify the configuration for transmission of the second SCI among the candidate configurations. For example, the first SCI could include an index identifying the configuration for transmission of the second SCI among the candidate configurations, such as the configuration index explained in connection with FIG. 5. However, it is noted that the first SCI could also include other information which may be used for implicitly identifying the configuration, such as the PPPP, an indicator whether the intended SL radio transmission is a unicast transmission or a broadcast transmission, and/or an indicator whether the SL radio transmission is intended to be performed in a SISO mode or in an MIMO mode, e.g., parameters as for example shown in the middle column of the configuration table of FIG. 5.

The configuration for transmission of the SCI may define radio resources forming a search space for transmission of the second SCI. In some scenarios, the configuration for transmission of the second SCI may also define radio resources forming multiple search spaces for transmission of the SCI. In this case, the configuration may also define a priority order of the multiple search spaces.

The configuration for transmission of the second SCI may also define one or more formats for transmission of the second SCI, such as the above-mentioned SCI formats. When defining multiple formats, the configuration may also define a priority order of these multiple formats. In addition or as an alternative, the configuration for transmission of the second SCI may also define one or more one or more aggregation levels for transmission of the second SCI. When defining multiple aggregation levels, the configuration may also define a priority order of these multiple aggregation levels. In addition or as an alternative, the configuration for transmission of the second SCI may also define one or more modulation and/or coding schemes for transmission of the second SCI. When defining multiple modulation and/or coding schemes, the configuration may also define a priority order of these multiple modulation and/or coding schemes.

At step 830, the radio device sends the first SCI to the further radio device. In some scenarios, the first SCI may also include information for sensing-based allocation of radio resources for the SL radio transmission, e.g., information defining a resource pool from which the radio resources can be located by the sensing-based allocation mechanism and/or information defining one or more radio channels to be monitored tourer at by the sensing-based allocation mechanism.

At step 840, the radio device sends the second SCI to the further radio device. This is accomplished based on the configuration related to the first SCI determined at step 820.

The second SCI may include information indicating at least one of: radio resources to be used for the SL radio transmission, an modulation and/or coding scheme to be used for the SL radio transmission, one or more retransmission parameters of the SL radio transmission, and a priority level of the SL radio transmission. The radio resources can be indicated in terms of time/frequency location and/or in terms of a resource reservation.

In some scenarios, at least one of the first SCI and the second SCI includes a common error detection code for checking integrity of both the first SCI and the second SCI. Based on the common error detection code, the radio device may perform a single integrity check to find out whether the first SCI and the second SCI were correctly received by the radio device.

At step 850, the radio device receives the SL radio transmission to the further radio device. This is accomplished based on the second SCI sent at step 840.

Figure 9:
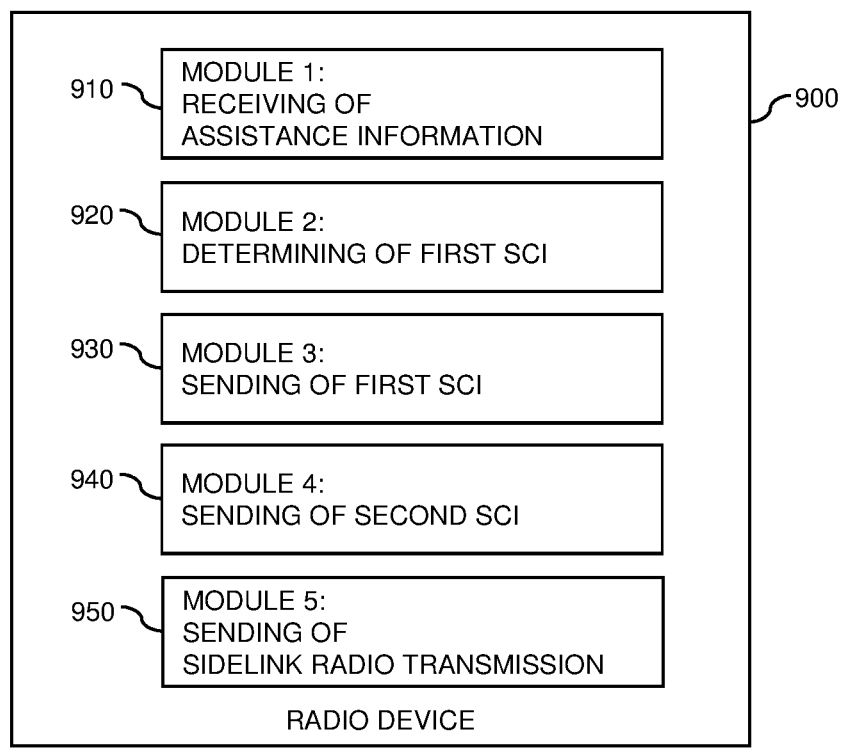
FIG. 9 shows a block diagram for illustrating functionalities of a sending radio device according to an embodiment of the invention.

FIG. 9 shows a block diagram for illustrating functionalities of a radio device 900 which operates according to the method of FIG. 8. The radio device 900 may for example correspond to the above-mentioned sending UE 20. As illustrated, the radio device 900 may optionally be provided with a module 910 configured to receive assistance information, such as explained in connection with step 810. Further, the radio device 900 may be provided with a module 920 configured to determine first SCI, such as explained in connection with step 820. Further, the radio device 900 may be provided with a module 930 configured to send the first SCI, such as explained in connection with step 830. Further, the radio device 900 may be provided with a module 940 configured to send the second SCI, such as explained in connection with step 840. Further, the radio device 900 may be provided with a module 950 configured to send the SL radio transmission, such as explained in connection with step 850.

It is noted that the radio device 900 may include further modules for implementing other functionalities, such as known functionalities of a UE supporting V2X or other types of SL communication. Further, it is noted that the modules of the radio device 900 do not necessarily represent a hardware structure of the radio device 900, but may also correspond to functional elements, e.g., implemented by hardware, software, or a combination thereof.

Figure 10:
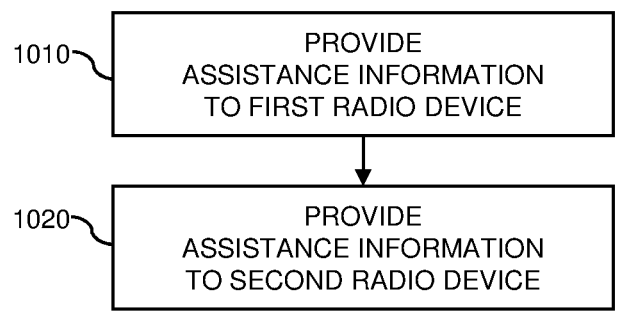
FIG. 10 shows a flowchart for schematically illustrating a method of controlling SL radio transmissions according to an embodiment of the invention.

FIG. 10 shows a flowchart for illustrating a method of controlling SL radio transmissions, which may be utilized for implementing the illustrated concepts. The method of FIG. 10 may be used for implementing the illustrated concepts in a node of a wireless communication network which controls at least one of a first radio device and a second radio device. Accordingly, at least some steps of the method may be performed by the node. The node could correspond to the above-mentioned access node 100, the first radio device could correspond to the above-mentioned sending UE 20, and the second radio device could correspond to the above-mentioned receiving UE 30. The first radio device may send an SL radio transmission to the second radio device. The SL radio transmission may include a transmission on a data channel, such as the above-mentioned transmission of SL data 207. Alternatively or in addition, the SL radio transmission may include a transmission of one or more reference signals, such as the above-mentioned transmission of reference symbols 208.

If a processor-based implementation of the node is used, at least some of the steps of the method of FIG. 10 may be performed and/or controlled by one or more processors of the node. Such radio device may also include a memory storing program code for implementing at least some of the below described functionalities or steps of the method of FIG. 10.

At step 1010, assistance information is provided to the first radio device. For example, the above-mentioned node may send the assistance information in response to the first radio device entering a service area of the node, such as explained in connection with the processes of FIG. 3A or FIG. 4. The node may send the assistance information via the second radio device to the first radio device, such as explained in connection with the processes of FIG. 3B.

The assistance information relates first SCI, such as the above-mentioned first stage SCI 204, transmitted from the first radio device to the second radio device, to a configuration for transmission of second SCI, such as the above-mentioned second stage SCI 206, from the first radio device to the second radio device.

At step 1020, the assistance information is provided to the second radio device. This may for example be accomplished in response to the second radio device entering the service area of the node, such as explained in connection with the processes of FIG. 3B or FIG. 4. The node may send the assistance information via the first radio device to the second radio device, such as explained in connection with the processes of FIG. 3A and FIG. 3C.

The first and the second radio device may then store the received assistance information for later usage.

In some scenarios, a first part of the configuration for transmission of the second SCI information may be defined by the first SCI and a second part of the configuration for transmission of the second SCI may be defined by the assistance information. For example, the assistance information may include one or more parameters defining the configuration, which in turn allow for implicitly deriving further parameters of the configuration. Examples of such parameters are the above-mentioned PPPP, the above-mentioned indicator whether the intended SL radio transmission is a unicast transmission or a broadcast transmission, and/or the above-mentioned indicator whether the SL radio transmission is intended to be performed in a SISO mode or in an MIMO mode, e.g., parameters as for example shown in the middle column of the configuration table of FIG. 5.

The assistance information may define multiple candidate configurations for transmission of the second SCI. In this case the first SCI may identify the configuration for transmission of the second SCI among the candidate configurations. For example, the first SCI could include an index identifying the configuration for transmission of the second SCI among the candidate configurations, such as the configuration index explained in connection with FIG. 5. However, it is noted that the first SCI could also include other information which may be used for implicitly identifying the configuration, such as the PPPP, an indicator whether the intended SL radio transmission is a unicast transmission or a broadcast transmission, and/or an indicator whether the SL radio transmission is intended to be performed in a SISO mode or in an MIMO mode, e.g., parameters as for example shown in the middle column of the configuration table of FIG. 5.

The configuration for transmission of the SCI may define radio resources forming a search space for transmission of the second SCI. In some scenarios, the configuration for transmission of the second SCI may also define radio resources forming multiple search spaces for transmission of the SCI. In this case, the configuration may also define a priority order of the multiple search spaces.

The configuration for transmission of the second SCI may also define one or more formats for transmission of the second SCI, such as the above-mentioned SCI formats. When defining multiple formats, the configuration may also define a priority order of these multiple formats. In addition or as an alternative, the configuration for transmission of the second SCI may also define one or more one or more aggregation levels for transmission of the second SCI. When defining multiple aggregation levels, the configuration may also define a priority order of these multiple aggregation levels. In addition or as an alternative, the configuration for transmission of the second SCI may also define one or more modulation and/or coding schemes for transmission of the second SCI. When defining multiple modulation and/or coding schemes, the configuration may also define a priority order of these multiple modulation and/or coding schemes.

In some scenarios, the first SCI may also include information for sensing-based allocation of radio resources for the SL radio transmission, e.g., information defining a resource pool from which the radio resources can be located by the sensing-based allocation mechanism and/or information defining one or more radio channels to be monitored tourer at by the sensing-based allocation mechanism.

The second SCI may include information indicating at least one of: radio resources to be used for the SL radio transmission, an modulation and/or coding scheme to be used for the SL radio transmission, one or more retransmission parameters of the SL radio transmission, and a priority level of the SL radio transmission. The radio resources can be indicated in terms of time/frequency location and/or in terms of a resource reservation.

In some scenarios, at least one of the first SCI and the second SCI includes a common error detection code for checking integrity of both the first SCI and the second SCI. Based on the common error detection code, the radio device may perform a single integrity check to find out whether the first SCI and the second SCI were correctly received by the radio device.

Figure 11:
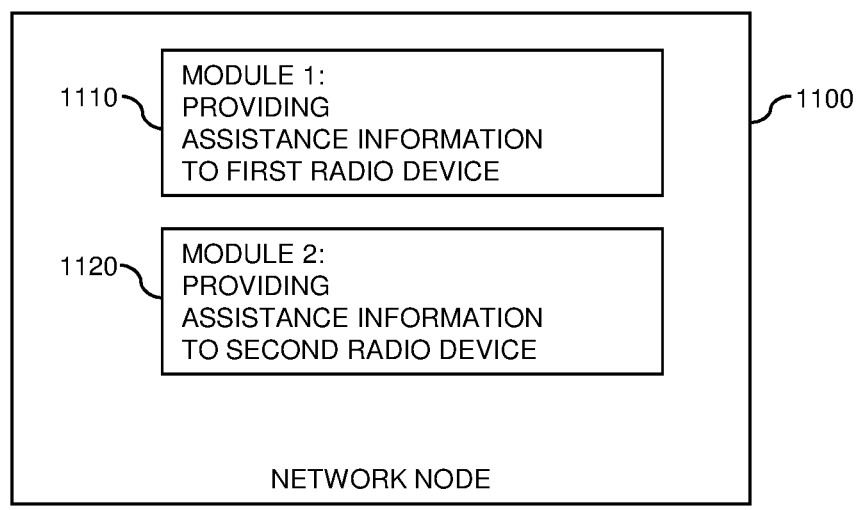
FIG. 11 shows a block diagram for illustrating functionalities of a network node according to an embodiment of the invention.

FIG. 11 shows a block diagram for illustrating functionalities of a node 1100 which operates according to the method of FIG. 10. The node 1100 may for example correspond to the above-mentioned access node 100. As illustrated, the node 1100 may be provided with a module 1110 configured to provide assistance information to a first radio device, such as explained in connection with step 1010. Further, the node may be provided with a module 1120 configured to provide the assistance information to a second radio device, such as explained in connection with step 1020.

It is noted that the radio device 1100 may include further modules for implementing other functionalities, such as known functionalities of an eNB of the LTE radio technology, a gNB of the NR technology, or similar access node.

It is noted that the functionalities as explained in connection with FIGS. 6 and 8, and optionally also FIG. 10 could also be combined in a system which includes a first radio device operating according to the method of FIG. 6, a second radio device operating according to the method of FIG. 8, and optionally a network node operating according to the method of FIG. 10. In such system, the first radio device may determine the first SCI based on the assistance information stored in the first radio device. The assistance information relates the first SCI to a configuration for transmission of second SCI. Further, the first radio device sends the first SCI to the second radio device. Based on the configuration related to the first SCI, the first radio device also sends the second SCI to the second radio device. Based on the second SCI, the first radio device sends an SL radio transmission to the second radio device. The second radio device receives the first SCI from the first radio device. Further, the second radio device determines, based on the assistance information stored in the second radio device and the received first SCI, the configuration for transmission of the second SCI. Further, the second radio device receives the second SCI based on the determined from the first radio device. Further, the second radio device receives the SL radio transmission based on the received second SCI from the first radio device. The node operating according to the method of FIG. 10 may provide the assistance information to the first radio device and/or to the second radio device.

Further, it is noted that the methods of FIGS. 6 and 8 could also be implemented within the same radio device, which acts both as a receiver and a sender of SL radio transmissions, e.g., when performing bidirectional SL communication with the further radio device.

Figure 12:
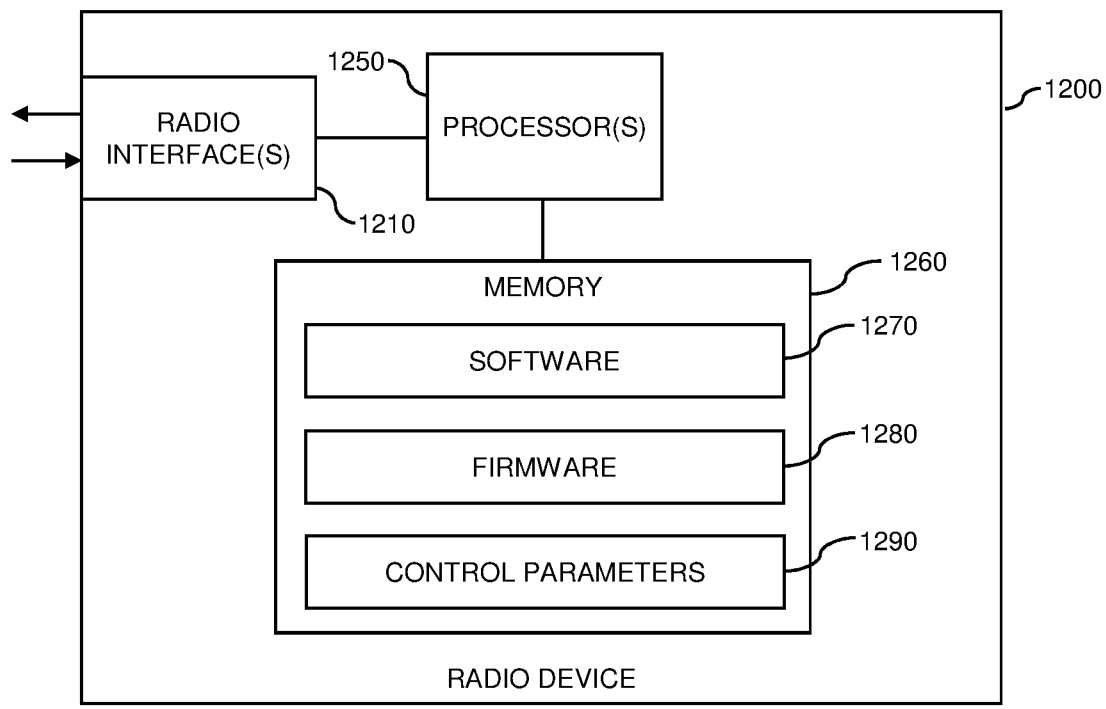
FIG. 12 schematically illustrates structures of a radio device according to an embodiment of the invention.

FIG. 12 illustrates a processor-based implementation of a radio device 1200 which may be used for implementing the above described concepts. For example, the structures as illustrated in FIG. 12 may be used for implementing the concepts in the above-mentioned sending UE 20 or receiving UE 30.

As illustrated, the radio device 1200 includes one or more radio interfaces 1210. The radio interface(s) 1210 may for example support a wireless access technology supporting SL radio transmissions, such as the LTE radio technology or NR radio technology. Furthermore, the radio interface(s) 1210 may support DL radio transmissions and UL radio transmissions with a wireless communication network.

Further, the radio device 1200 may include one or more processors 1250 coupled to the radio interface(s) 1210 and a memory 1260 coupled to the processor(s) 1250. By way of example, the radio interface(s) 1210, the processor(s) 1250, and the memory 1260 could be coupled by one or more internal bus systems of the radio device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of a radio device or apparatus for controlling radio devices, such as explained in connection with FIGS. 6 and/or 8.

It is to be understood that the structures as illustrated in FIG. 12 are merely schematic and that the radio device 1200 may actually include further components which, for the sake of clarity, have not been illustrated, e.g., further interfaces or processors. Also, it is to be understood that the memory 1260 may include further program code for implementing known functionalities of a UE supporting SL radio transmissions, e.g., for implementing V2X communication. According to some embodiments, also a computer program may be provided for implementing functionalities of the radio device 1200, e.g., in the form of a physical medium storing the program code and/or other data to be stored in the memory 1260 or by making the program code available for download or by streaming.

Figure 13:
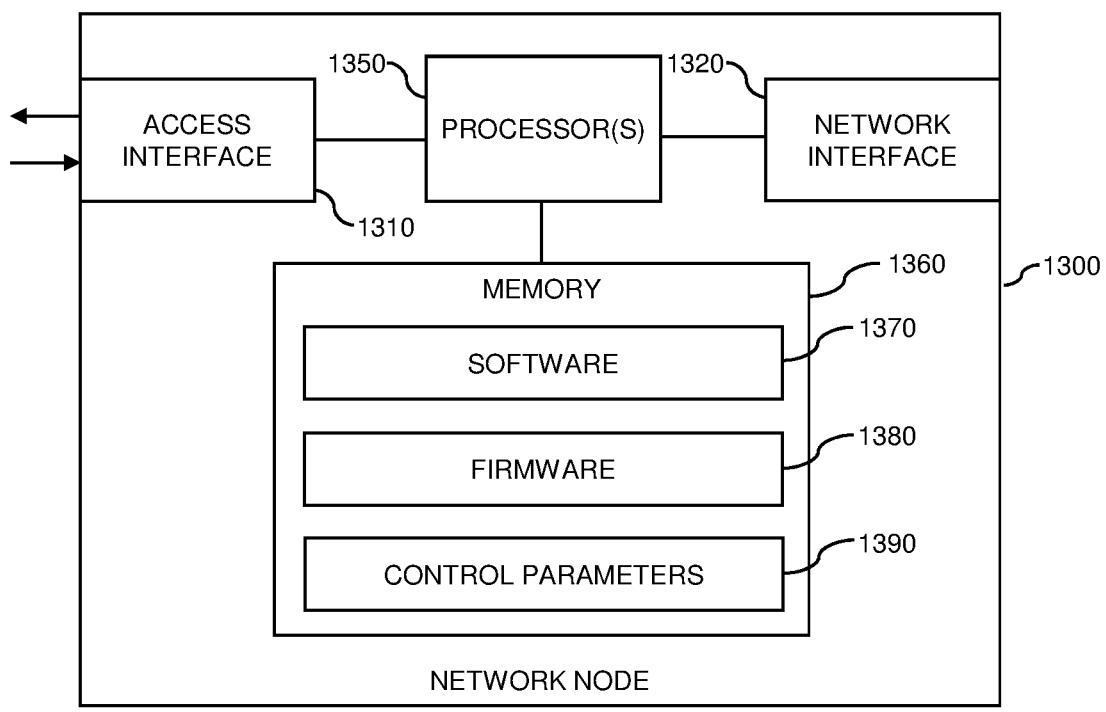
FIG. 13 schematically illustrates structures of a network node according to an embodiment of the invention.

FIG. 13 illustrates a processor-based implementation of a network node 1300 which may be used for implementing the above described concepts. For example, the structures as illustrated in FIG. 13 may be used for implementing the concepts in the above-mentioned sending.

As illustrated, the network node 1300 includes an access interface 1310. The access interface 1310 may be used for communication with one or more radio devices by DL radio transmissions and UL radio transmissions and for controlling these radio devices. If the network node corresponds to an access node, the access interface 1310 may be a radio interface. However, in some scenarios the network node 1300 could also correspond to a more centralized node, e.g., a core network node. In this case, the access interface 1300 could also correspond to an interface for communication with an access node serving the radio devices. The above-mentioned sending UE 20 and receiving UE 30 are examples of such radio devices. As further illustrated, the access node may also include a network interface 1320 which may be used for communication with other network nodes.

Further, the network node 1300 may include one or more processors 1350 coupled to the access interface 1310 and a memory 1360 coupled to the processor(s) 1350. By way of example, the access interface 1310, the processor(s) 1350, and the memory 1360 could be coupled by one or more internal bus systems of the network node 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370, firmware 1380, and/or control parameters 1390. The memory 1360 may include suitably configured program code to be executed by the processor(s) 1350 so as to implement the above-described functionalities of a network node, such as explained in connection with FIG. 10.

It is to be understood that the structures as illustrated in FIG. 13 are merely schematic and that the network node 1300 may actually include further components which, for the sake of clarity, have not been illustrated, e.g., further interfaces or processors. Also, it is to be understood that the memory 1360 may include further program code for implementing known functionalities of eNB of the LTE radio technology, a gNB of the NR radio technology, or similar network node. According to some embodiments, also a computer program may be provided for implementing functionalities of the network node 1300, e.g., in the form of a physical medium storing the program code and/or other data to be stored in the memory 1360 or by making the program code available for download or by streaming.

As can be seen, the concepts as described above may be used for controlling SL radio transmissions in a highly efficient manner. In particular, variability of SCI used for controlling the SL radio transmissions may be enhanced without excessively increasing complexity required at a receiver of the SL radio transmissions. In particular, blind decoding by the receiver of the SL radio transmissions can be reduced or even completely avoided. In this way, various use cases having different requirements can be efficiently supported for the SL radio transmissions. Furthermore, the transmission of the SCI can be organized in a manner which facilitates backwards compatibility.

It is to be understood that the examples and embodiments as explained above are merely illustrative and susceptible to various modifications. For example, the illustrated concepts may be applied in connection with various kinds of radio technologies, without limitation to the above-mentioned examples of the LTE radio technology or NR radio technology. Further, it is noted that the concepts are not limited to reducing two stages of SCI, but could also be applied in a corresponding manner to any higher number of stages where the configuration of each stage is implicitly determined from the SCI transmitted in the previous stage. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling sidelink radio transmissions in a wireless communication network, the method comprising:

a radio device (30) receiving first sidelink control information (204) from a further radio device (20);

based on assistance information stored in the radio device (30) and the received first sidelink control information (204), the radio device (30) determining a configuration for transmission of second sidelink control information (206);

based on the determined configuration for transmission of the second sidelink control information (206), the radio device (30) receiving the second sidelink control information (206) from the further radio device (20); and based on the received second sidelink control information (206), the radio device (30) receiving a sidelink radio transmission (207, 208) from the further radio device (20).

Embodiment 2: The method according to embodiment 1, wherein the assistance information defines multiple candidate configurations for transmission of the second sidelink control information (206); and wherein the first sidelink control information (204) identifies the configuration for transmission of the second sidelink control information (206) among the candidate configurations.

Embodiment 3: The method according to embodiment 2, wherein the first sidelink control information (204) comprises an index identifying the configuration for transmission of the second sidelink control information (206) among the candidate configurations.

Embodiment 4: The method according to any one of embodiments 1 to 3,
wherein the first sidelink control information (204) comprises information for sensing-based allocation of radio resources for the sidelink radio transmission (207, 208).

Embodiment 5: The method according to any one of embodiments 1 to 4,
wherein the second sidelink control information (206) comprises information indicating at least one of: radio resources to be used for the sidelink radio transmission (207, 208), a modulation and/or coding scheme to be used for the sidelink radio transmission (207, 208), one or more retransmission parameters of the sidelink radio transmission (207, 208), and a priority level of the sidelink radio transmission (207, 208).

Embodiment 6: The method according to any one of embodiments 1 to 5,
wherein a first part of the configuration for transmission of the second sidelink control information (206) is defined by the first sidelink control information (204) and a second part of the configuration for transmission of the second sidelink control information (206) is defined by the assistance information.

Embodiment 7: The method according to any one of embodiments 1 to 6,
wherein the configuration for transmission of the second sidelink control information (206) defines radio resources forming a search space for transmission of the second sidelink control information (206).

Embodiment 8: The method according to embodiment 7, wherein the configuration for transmission of the second sidelink control information (206) defines radio resources forming multiple search spaces for transmission of the second sidelink control information (206) and a priority order of the multiple search spaces.

Embodiment 9: The method according to any one of embodiments 1 to 8,
wherein the configuration for transmission of the second sidelink control information (206) defines a format for transmission of the second sidelink control information (206).

Embodiment 10: The method according to any one of embodiments 1 to 9,
wherein the configuration for transmission of the second sidelink control information (206) defines an aggregation level for transmission of the second sidelink control information (206).

Embodiment 11: The method according to any one of embodiments 1 to 10,
wherein the configuration for transmission of the second sidelink control information (206) defines a modulation and/or coding scheme for transmission of the second sidelink control information (206).

Embodiment 12: The method according to any one of embodiments 1 to 11,
wherein at least one of the first sidelink control information (204) and the second sidelink control information (206) comprises a common error detection code for checking integrity of both the first sidelink control information (204) and the second sidelink control information (206).

Embodiment 13: The method according to any one of embodiments 1 to 12, comprising:

the radio device (30) receiving at least a part of the assistance information from a node (100) of the wireless communication network; and the radio device (30) storing the received assistance information.

Embodiment 14: The method according to embodiment 13, comprising:

the radio device (30) receiving the at least part of the assistance information in response to the radio device (30) entering a service area of the node (100).

Embodiment 15: The method according to any one of embodiments 1 to 14, comprising:

the radio device (30) receiving at least a part of the assistance information from the further radio device (20).

Embodiment 16: The method according to embodiment 15, comprising:

the radio device (30) receiving the at least part of the assistance information in response to the radio device (30) entering a radio coverage area of the further radio device (20).

Embodiment 17: The method according to any one of embodiments 13 to 16, comprising:

the radio device (30) receiving the at least part of the assistance information in response to a request (306; 313) from the radio device (30).

Embodiment 18: The method according to any one of embodiments 1 to 17, wherein the sidelink radio transmission (207, 208) comprises a transmission on a data channel.

Embodiment 19: The method according to any one of embodiments 1 to 18, wherein the sidelink radio transmission (207, 208) comprises a transmission of one or more reference signals.

Embodiment 20: A method of controlling sidelink radio transmissions in a wireless communication network, the method comprising:

based on assistance information stored in a radio device (20), the radio device (20) determining first sidelink control information (204), the assistance information relating the first sidelink control information (204) to a configuration for transmission of second sidelink control information (206);

the radio device (20) sending the first sidelink control information (204) to a further radio device (30);

based on the configuration, the radio device (20) sending the second sidelink control information (206) to the further radio device (30); and based on the second sidelink control information (206), the radio device (20) sending a sidelink radio transmission (207, 208) to the further radio device (30).

Embodiment 21: The method according to embodiment 20, wherein the assistance information defines multiple candidate configurations for transmission of the second sidelink control information (206); and wherein the first sidelink control information (204) identifies the configuration for transmission of the second sidelink control information (206) among the candidate configurations.

Embodiment 22: The method according to embodiment 21, wherein the first sidelink control information (204) comprises an index identifying the configuration for transmission of the second sidelink control information (206) among the candidate configurations.

Embodiment 23: The method according to any one of embodiments 20 to 22, wherein the first sidelink control information (204) comprises information for sensing-based allocation of radio resources for the sidelink radio transmission (207, 208).

Embodiment 24: The method according to any one of embodiments 20 to 23, wherein the second sidelink control information (206) comprises information indicating at least one of: radio resources to be used for the sidelink radio transmission (207, 208), a modulation and/or coding scheme to be used for the sidelink radio transmission (207, 208), one or more retransmission parameters of the sidelink radio transmission (207, 208), and a priority level of the sidelink radio transmission (207, 208).

Embodiment 25: The method according to any one of embodiments 20 to 24, wherein a first part of the configuration for transmission of the second sidelink control information (206) is defined by the first sidelink control information (204) and a second part of the configuration for transmission of the second sidelink control information (206) is defined by the assistance information.

Embodiment 26: The method according to any one of embodiments 20 to 25, wherein the configuration for transmission of the second sidelink control information (206) defines radio resources forming a search space for transmission of the second sidelink control information (206).

Embodiment 27: The method according to embodiment 26, wherein the configuration for transmission of the second sidelink control information (206) defines radio resources forming multiple search spaces for transmission of the second sidelink control information (206) and a priority order of the multiple search spaces.

Embodiment 28: The method according to any one of embodiments 20 to 27, wherein the configuration for transmission of the second sidelink control information (206) defines a format for transmission of the second sidelink control information (206).

Embodiment 29: The method according to any one of embodiments 20 to 28, wherein the configuration for transmission of the second sidelink control information (206) defines an aggregation level for transmission of the second sidelink control information (206).

Embodiment 30: The method according to any one of embodiments 20 to 29, wherein the configuration for transmission of the second sidelink control information (206) defines a modulation and/or coding scheme for transmission of the second sidelink control information (206).

Embodiment 31: The method according to any one of embodiments 20 to 30, wherein at least one of the first sidelink control information (204) and the second sidelink control information (206) comprises a common error detection code for checking integrity of both the first sidelink control information (204) and the second sidelink control information (206).

Embodiment 32: The method according to any one of embodiments 20 to 31, comprising:

the radio device (20) receiving at least a part of the assistance information from a node (100) of the wireless communication network; and the radio device (20) storing the received assistance information.

Embodiment 33: The method according to embodiment 32, comprising:

the radio device (20) receiving the at least part of the assistance information in response to the radio device (20) entering a service area of the node (100).

Embodiment 34: The method according to any one of embodiments 20 to 33, comprising:

the radio device (20) receiving at least a part of the assistance information from the further radio device (30).

Embodiment 35: The method according to embodiment 34, comprising:

the radio device (20) receiving the at least part of the assistance information in response to the radio device (20) entering a radio coverage area of the further radio device (30).

Embodiment 36: The method according to any one of embodiments 32 to 35, comprising:

the radio device (20) receiving the at least part of the assistance information in response to a request (302) from the radio device (20).

Embodiment 37: The method according to any one of embodiments 20 to 36, wherein the sidelink radio transmission (207, 208) comprises a transmission on a data channel.

Embodiment 38: The method according to any one of embodiments 20 to 37, wherein the sidelink radio transmission (207, 208) comprises a transmission of one or more reference signals.

Embodiment 39: A method of controlling sidelink radio transmissions in a wireless communication network, the method comprising:

providing assistance information to a first radio device (20); and providing the assistance information to a second radio device (30), the assistance information relating first sidelink control information (204), transmitted from the first radio device (20) to the second radio device (30), to a configuration for transmission of second sidelink control information (206) from the first radio device (20) to the second radio device (30).

Embodiment 40: The method according to embodiment 39, wherein the assistance information defines multiple candidate configurations for transmission of the second sidelink control information (206); and wherein the first sidelink control information (204) identifies the configuration for transmission of the second sidelink control information (206) among the candidate configurations.

Embodiment 41: The method according to embodiment 40, wherein the first sidelink control information (204) comprises an index identifying the configuration for transmission of the second sidelink control information (206) among the candidate configurations.

Embodiment 42: The method according to any one of embodiments 39 to 41, wherein the first sidelink control information (204) comprises information for sensing-based allocation of radio resources for the sidelink radio transmission (207, 208).

Embodiment 43: The method according to any one of embodiments 39 to 42, wherein the second sidelink control information (206) comprises information indicating at least one of: radio resources to be used for the sidelink radio transmission (207, 208), a modulation and/or coding scheme to be used for the sidelink radio transmission (207, 208), one or more retransmission parameters of the sidelink radio transmission (207, 208), and a priority level of the sidelink radio transmission (207, 208).

Embodiment 44: The method according to any one of embodiments 39 to 43, wherein a first part of the configuration for transmission of the second sidelink control information (206) is defined by the first sidelink control information (204) and a second part of the configuration for transmission of the second sidelink control information (206) is defined by the assistance information.

Embodiment 45: The method according to any one of embodiments 39 to 44, wherein the configuration for transmission of the second sidelink control information (206) defines radio resources forming a search space for transmission of the second sidelink control information (206).

Embodiment 46: The method according to embodiment 45, wherein the configuration for transmission of the second sidelink control information (206) defines radio resources forming multiple search spaces for transmission of the second sidelink control information (206) and a priority order of the multiple search spaces.

Embodiment 47: The method according to any one of embodiments 39 to 46, wherein the configuration for transmission of the second sidelink control information (206) defines a format for transmission of the second sidelink control information (206).

Embodiment 48: The method according to any one of embodiments 39 to 47, wherein the configuration for transmission of the second sidelink control information (206) defines an aggregation level for transmission of the second sidelink control information (206).

Embodiment 49: The method according to any one of embodiments 39 to 48, wherein the configuration for transmission of the second sidelink control information (206) defines a modulation and/or coding scheme for transmission of the second sidelink control information (206).

Embodiment 50: The method according to any one of embodiments 39 to 49, comprising:

a node (100) of the wireless communication network sending the assistance information in response to the first radio device (20) and/or the second radio device (30) entering a service (101) area of the node (100).

Embodiment 51: The method according to any one of embodiments 39 to 50, comprising:

a node (100) of the wireless communication network sending the assistance information in response to a request (302; 306) from the first radio device (20) and/or a request from the second radio device (30).

Embodiment 52: The method according to any one of embodiments 39 to 51, comprising:

a node (100) of the wireless communication network sending the assistance information via the first radio device (20) to the second radio device (30).

Embodiment 53: The method according to any one of embodiments 39 to 52, comprising:

a node (100) of the wireless communication network sending the assistance information via the second radio device (30) to the first radio device (20).

Embodiment 54: The method according to any one of embodiments 39 to 53, wherein the sidelink radio transmission (207, 208) comprises a transmission on a data channel.

Embodiment 55: The method according to any one of embodiments 39 to 54, wherein the sidelink radio transmission (207, 208) comprises a transmission of one or more reference signals.

Embodiment 56: A radio device (30) for a wireless communication network, the radio device (30) being configured to:

receive first sidelink control information (204) from a further radio device (20);

based on assistance information stored in the radio device (30) and the received first sidelink control information (204), determine a configuration for transmission of second sidelink control information (206);

based on the determined configuration for transmission of the second sidelink control information (206), receive the second sidelink control information (206) from the further radio device (20); and based on the received second sidelink control information (206), receive a sidelink radio transmission (207, 208) from the further radio device (20).

Embodiment 57: The radio device (30) according to embodiment 56, wherein the assistance information defines multiple candidate configurations for transmission of the second sidelink control information (206); and wherein the first sidelink control information (204) identifies the configuration for transmission of the second sidelink control information (206) among the candidate configurations.

Embodiment 58: The radio device (30) according to embodiment 57, wherein the first sidelink control information (204) comprises an index identifying the configuration for transmission of the second sidelink control information (206) among the candidate configurations.

Embodiment 59: The radio device (30) according to any one of embodiments 56 to 58, wherein the first sidelink control information (204) comprises information for sensing-based allocation of radio resources for the sidelink radio transmission (207, 208).

Embodiment 60: The radio device (30) according to any one of embodiments 56 to 59, wherein the second sidelink control information (206) comprises information indicating at least one of: radio resources to be used for the sidelink radio transmission (207, 208), a modulation and/or coding scheme to be used for the sidelink radio transmission (207, 208), one or more retransmission parameters of the sidelink radio transmission (207, 208), and a priority level of the sidelink radio transmission (207, 208).

Embodiment 61: The radio device (30) according to any one of embodiments 56 to 60, wherein a first part of the configuration for transmission of the second sidelink control information (206) is defined by the first sidelink control information (204) and a second part of the configuration for transmission of the second sidelink control information (206) is defined by the assistance information.

Embodiment 62: The radio device (30) according to any one of embodiments 56 to 61, wherein the configuration for transmission of the second sidelink control information (206) defines radio resources forming a search space for transmission of the second sidelink control information (206).

Embodiment 63: The radio device (30) according to embodiment 62, wherein the configuration for transmission of the second sidelink control information (206) defines radio resources forming multiple search spaces for transmission of the second sidelink control information (206) and a priority order of the multiple search spaces.

Embodiment 64: The radio device (30) according to any one of embodiments 56 to 63, wherein the configuration for transmission of the second sidelink control information (206) defines a format for transmission of the second sidelink control information (206).

Embodiment 65: The radio device (30) according to any one of embodiments 56 to 64, wherein the configuration for transmission of the second sidelink control information (206) defines an aggregation level for transmission of the second sidelink control information (206).

Embodiment 66: The radio device (30) according to any one of embodiments 56 to 65, wherein the configuration for transmission of the second sidelink control information (206) defines a modulation and/or coding scheme for transmission of the second sidelink control information (206).

Embodiment 67: The radio device (30) according to any one of embodiments 56 to 66, wherein at least one of the first sidelink control information (204) and the second sidelink control information (206) comprises a common error detection code for checking integrity of both the first sidelink control information (204) and the second sidelink control information (206).

Embodiment 68: The radio device (30) according to any one of embodiments 56 to 67, wherein the radio device (30) is configured to:

receive at least a part of the assistance information from a node (100) of the wireless communication network; and store the received assistance information.

Embodiment 69: The radio device (30) according to embodiment 13, comprising:

wherein the radio device (30) is configured to receive the at least part of the assistance information in response to the radio device (30) entering a service area of the node (100).

Embodiment 70: The radio device (30) according to any one of embodiments 56 to 69, wherein the radio device (30) is configured to receive at least a part of the assistance information from the further radio device (20).

Embodiment 71: The radio device (30) according to embodiment 70, wherein the radio device (30) is configured to receive the at least part of the assistance information in response to the radio device (30) entering a radio coverage area of the further radio device (20).

Embodiment 72: The radio device (30) according to any one of embodiments 68 to 71, wherein the radio device (30) is configured to receive the at least part of the assistance information in response to a request (306; 313) from the radio device (30).

Embodiment 73: The radio device (30) according to any one of embodiments 56 to 72, wherein the sidelink radio transmission (207, 208) comprises a transmission on a data channel.

Embodiment 74: The radio device (30) according to any one of embodiments 56 to 73, wherein the sidelink radio transmission (207, 208) comprises a transmission of one or more reference signals.

Embodiment 75: The radio device (30) according to embodiment 56, wherein the radio device (30) is configured to perform the steps of a method according to any one of embodiments 1 to 19.

Embodiment 76: The radio device (30) according to any one of embodiments 56 to 75, comprising:

at least one processor and a memory containing instructions executable by said at least one processor, whereby the radio device (30) is operative to perform a method according to any one of embodiments 1 to 19.

Embodiment 77: A radio device (20) for a wireless communication network, the radio device (20) being configured to:

based on assistance information stored in the radio device (20), determine first sidelink control information (204), the assistance information relating the first sidelink control information (204) to a configuration for transmission of second sidelink control information (206);

sending the first sidelink control information (204) to a further radio device (30);

based on the configuration, send the second sidelink control information (206) to the further radio device (30); and based on the second sidelink control information (206), send a sidelink radio transmission (207, 208) to the further radio device (30).

Embodiment 78: The radio device (20) according to embodiment 77, wherein the assistance information defines multiple candidate configurations for transmission of the second sidelink control information (206); and wherein the first sidelink control information (204) identifies the configuration for transmission of the second sidelink control information (206) among the candidate configurations.

Embodiment 79: The radio device (20) according to embodiment 78, wherein the first sidelink control information (204) comprises an index identifying the configuration for transmission of the second sidelink control information (206) among the candidate configurations.

Embodiment 80: The radio device (20) according to any one of embodiments 77 to 79, wherein the first sidelink control information (204) comprises information for sensing-based allocation of radio resources for the sidelink radio transmission (207, 208).

Embodiment 81: The radio device (20) according to any one of embodiments 77 to 80, wherein the second sidelink control information (206) comprises information indicating at least one of: radio resources to be used for the sidelink radio transmission (207, 208), a modulation and/or coding scheme to be used for the sidelink radio transmission (207, 208), one or more retransmission parameters of the sidelink radio transmission (207, 208), and a priority level of the sidelink radio transmission (207, 208).

Embodiment 82: The radio device (20) according to any one of embodiments 77 to 81, wherein a first part of the configuration for transmission of the second sidelink control information (206) is defined by the first sidelink control information (204) and a second part of the configuration for transmission of the second sidelink control information (206) is defined by the assistance information.

Embodiment 83: The radio device (20) according to any one of embodiments 77 to 82, wherein the configuration for transmission of the second sidelink control information (206) defines radio resources forming a search space for transmission of the second sidelink control information (206).

Embodiment 84: The radio device (20) according to embodiment 83, wherein the configuration for transmission of the second sidelink control information (206) defines radio resources forming multiple search spaces for transmission of the second sidelink control information (206) and a priority order of the multiple search spaces.

Embodiment 85: The radio device (20) according to any one of embodiments 77 to 84, wherein the configuration for transmission of the second sidelink control information (206) defines a format for transmission of the second sidelink control information (206).

Embodiment 86: The radio device (20) according to any one of embodiments 77 to 85, wherein the configuration for transmission of the second sidelink control information (206) defines an aggregation level for transmission of the second sidelink control information (206).

Embodiment 87: The radio device (20) according to any one of embodiments 77 to 86, wherein the configuration for transmission of the second sidelink control information (206) defines a modulation and/or coding scheme for transmission of the second sidelink control information (206).

Embodiment 88: The radio device (20) according to any one of embodiments 77 to 87, wherein at least one of the first sidelink control information (204) and the second sidelink control information (206) comprises a common error detection code for checking integrity of both the first sidelink control information (204) and the second sidelink control information (206).

Embodiment 89: The radio device (20) according to any one of embodiments 77 to 88, wherein the radio device (20) is configured to:

receive at least a part of the assistance information from a node (100) of the wireless communication network; and store the received assistance information.

Embodiment 90: The radio device (20) according to embodiment 89, wherein the radio device (20) is configured to receive the at least part of the assistance information in response to the radio device (20) entering a service area of the node (100).

Embodiment 91: The radio device (20) according to any one of embodiments 77 to 90, wherein the radio device (20) is configured to receive at least a part of the assistance information from the further radio device (30).

Embodiment 92: The radio device (20) according to embodiment 91, comprising:

wherein the radio device (20) is configured to receive the at least part of the assistance information in response to the radio device (20) entering a radio coverage area of the further radio device (30).

Embodiment 93: The radio device (20) according to any one of embodiments 77 to 92, wherein the radio device (20) is configured to receive the at least part of the assistance information in response to a request (302) from the radio device (20).

Embodiment 94: The radio device (20) according to any one of embodiments 77 to 93, wherein the sidelink radio transmission (207, 208) comprises a transmission on a data channel.

Embodiment 95: The radio device (20) according to any one of embodiments 77 to 94, wherein the sidelink radio transmission (207, 208) comprises a transmission of one or more reference signals.

Embodiment 96: The radio device (20) according to embodiment 77, wherein the radio device (20) is configured to perform the steps of a method according to any one of embodiments 20 to 38.

Embodiment 97: The radio device (20) according to any one of embodiments 77 to 96, comprising:

at least one processor and a memory containing instructions executable by said at least one processor, whereby the radio device (20) is operative to perform a method according to any one of embodiments 20 to 38.

Embodiment 98: A node (100) for a wireless communication network, the radio device (100) being configured to:

provide assistance information to a first radio device (20); and provide the assistance information to a second radio device (30), the assistance information relating first sidelink control information (204), transmitted from the first radio device (20) to the second radio device (30), to a configuration for transmission of second sidelink control information (206) from the first radio device (20) to the second radio device (30).

Embodiment 99: The node (100) according to embodiment 98, wherein the assistance information defines multiple candidate configurations for transmission of the second sidelink control information (206); and wherein the first sidelink control information (204) identifies the configuration for transmission of the second sidelink control information (206) among the candidate configurations.

Embodiment 100: The node (100) according to embodiment 99, wherein the first sidelink control information (204) comprises an index identifying the configuration for transmission of the second sidelink control information (206) among the candidate configurations.

Embodiment 101: The node (100) according to any one of embodiments 98 to 100, wherein the first sidelink control information (204) comprises information for sensing-based allocation of radio resources for the sidelink radio transmission (207, 208).

Embodiment 102: The node (100) according to any one of embodiments 98 to 101, wherein the second sidelink control information (206) comprises information indicating at least one of: radio resources to be used for the sidelink radio transmission (207, 208), a modulation and/or coding scheme to be used for the sidelink radio transmission (207, 208), one or more retransmission parameters of the sidelink radio transmission (207, 208), and a priority level of the sidelink radio transmission (207, 208).

Embodiment 103: The node (100) according to any one of embodiments 98 to 102, wherein a first part of the configuration for transmission of the second sidelink control information (206) is defined by the first sidelink control information (204) and a second part of the configuration for transmission of the second sidelink control information (206) is defined by the assistance information.

Embodiment 104: The node (100) according to any one of embodiments 98 to 103, wherein the configuration for transmission of the second sidelink control information (206) defines radio resources forming a search space for transmission of the second sidelink control information (206).

Embodiment 105: The node (100) according to embodiment 104, wherein the configuration for transmission of the second sidelink control information (206) defines radio resources forming multiple search spaces for transmission of the second sidelink control information (206) and a priority order of the multiple search spaces.

Embodiment 106: The node (100) according to any one of embodiments 98 to 105, wherein the configuration for transmission of the second sidelink control information (206) defines a format for transmission of the second sidelink control information (206).

Embodiment 107: The node (100) according to any one of embodiments 98 to 106, wherein the configuration for transmission of the second sidelink control information (206) defines an aggregation level for transmission of the second sidelink control information (206).

Embodiment 108: The node (100) according to any one of embodiments 98 to 107, wherein the configuration for transmission of the second sidelink control information (206) defines a modulation and/or coding scheme for transmission of the second sidelink control information (206).

Embodiment 109: The node (100) according to any one of embodiments 98 to 108, wherein the node (100) is configured to send the assistance information in response to the first radio device (20) and/or the second radio device (30) entering a service (101) area of the node (100).

Embodiment 110: The node (100) according to any one of embodiments 98 to 109, wherein the node (100) is configured to send the assistance information in response to a request (302; 306) from the first radio device (20) and/or a request from the second radio device (30).

Embodiment 111: The node (100) according to any one of embodiments 98 to 110, wherein the node (100) is configured to send the assistance information via the first radio device (20) to the second radio device (30).

Embodiment 112: The node (100) according to any one of embodiments 98 to 111, wherein the node (100) is configured to send the assistance information via the second radio device (30) to the first radio device (20).

Embodiment 113: The node (100) according to any one of embodiments 98 to 112, wherein the sidelink radio transmission (207, 208) comprises a transmission on a data channel.

Embodiment 114: The node (100) according to any one of embodiments 98 to 113, wherein the sidelink radio transmission (207, 208) comprises a transmission of one or more reference signals.

Embodiment 115: The node (100) according to embodiment 98, wherein the node (100) is configured to perform the steps of a method according to any one of embodiments 39 to 55.

Embodiment 116: The node (100) according to any one of embodiments 98 to 115, comprising:

at least one processor and a memory containing instructions executable by said at least one processor, whereby the node (100) is operative to perform a method according to any one of embodiments 39 to 55.

Embodiment 117: A system, comprising:

a first radio device (20) and a second radio device (30) storing assistance information; the first radio device (20) being configured to:

based on the assistance information stored in the first radio device (20), determine first sidelink control information (204), the assistance information relating the first sidelink control information (204) to a configuration for transmission of second sidelink control information (206);

send the first sidelink control information (204) to the second radio device (30);

based on the configuration, send the second sidelink control information (206) to the second radio device (30); and based on the second sidelink control information (206), send a sidelink radio transmission (207, 208) to the second radio device (30);

the second radio device (30) being configured to:

receive the first sidelink control information (204) from the first radio device (20);

based on the assistance information stored in the second radio device (30) and the received first sidelink control information (204), determine the configuration for transmission of the second sidelink control information (206);

based on the determined configuration for transmission of the second sidelink control information (206), receive the second sidelink control information (206) from the first radio device (20); and based on the received second sidelink control information (206), receive the sidelink radio transmission (207, 208) from the first radio device (20).

Embodiment 118: The system according to embodiment 117, further comprising:

a node (100) of the wireless communication network, the node (100) being configured to provide the assistance information to the first radio device (20) and/or to the second radio device (30).

Embodiment 119: A computer program comprising program code to be executed by at least one processor of a radio device (30, 20), whereby execution of the program code causes the radio device (30, 20) to perform a method according to any one of embodiments 1 to 38.

Embodiment 120: A computer program product comprising program code to be executed by at least one processor of a radio device (30, 20), whereby execution of the program code causes the radio device (30, 20) to perform a method according to any one of embodiments 1 to 38.

Embodiment 121: A computer program comprising program code to be executed by at least one processor of a node (100) of a wireless communication network, whereby execution of the program code causes the node (100) to perform a method according to any one of embodiments 39 to 55.

Embodiment 122: A computer program product comprising program code to be executed by at least one processor of a node (100) of a wireless communication network, whereby execution of the program code causes the node (100) to perform a method according to any one of embodiments 39 to 55.

The invention claimed is:

1. A method of controlling sidelink radio transmissions in a wireless communication network, the method comprising:
   a radio device receiving first sidelink control information from a further radio device;
   based on assistance information stored in the radio device and the received first sidelink control information, the radio device determining a configuration for transmission of second sidelink control information;
   based on the determined configuration for transmission of the second sidelink control information, the radio device receiving the second sidelink control information from the further radio device; and
   based on the received second sidelink control information, the radio device receiving a sidelink radio transmission from the further radio device.

2. The method according to claim 1,
   wherein the assistance information defines multiple candidate configurations for transmission of the second sidelink control information; and
   wherein the first sidelink control information identifies the configuration for transmission of the second sidelink control information among the candidate configurations.

3. The method according to claim 1,
   wherein a first part of the configuration for transmission of the second sidelink control information is defined by the first sidelink control information and a second part of the configuration for transmission of the second sidelink control information is defined by the assistance information.

4. The method according to claim 1,
   wherein the configuration for transmission of the second sidelink control information defines radio resources forming one of a search space for transmission of the second sidelink control information and/or multiple search spaces for transmission of the second sidelink control information and a priority order of the multiple search spaces.

5. A method of controlling sidelink radio transmissions in a wireless communication network, the method comprising:
   based on assistance information stored in a radio device, the radio device determining first sidelink control information, the assistance information relating the first sidelink control information to a configuration for transmission of second sidelink control information;

the radio device sending the first sidelink control information to a further radio device;

based on the configuration, the radio device sending the second sidelink control information to the further radio device; and based on the second sidelink control information, the radio device sending a sidelink radio transmission to the further radio device.

6. The method according to claim 5,
wherein the assistance information defines multiple candidate configurations for transmission of the second sidelink control information; and
wherein the first sidelink control information identifies the configuration for transmission of the second sidelink control information among the candidate configurations.

7. The method according to claim 5,
wherein a first part of the configuration for transmission of the second sidelink control information is defined by the first sidelink control information and a second part of the configuration for transmission of the second sidelink control information is defined by the assistance information.

8. The method according to claim 5,
wherein the configuration for transmission of the second sidelink control information defines radio resources forming one of a search space for transmission of the second sidelink control information and/or multiple search spaces for transmission of the second sidelink control information and a priority order of the multiple search spaces.

9. A method of controlling sidelink radio transmissions in a wireless communication network, the method comprising:
providing assistance information to a first radio device; and
providing the assistance information to a second radio device,
the assistance information relating first sidelink control information, transmitted from the first radio device to the second radio device, to a configuration for transmission of second sidelink control information from the first radio device to the second radio device.

10. The method according to claim 9,
wherein the assistance information defines multiple candidate configurations for transmission of the second sidelink control information; and
wherein the first sidelink control information identifies the configuration for transmission of the second sidelink control information among the candidate configurations.

11. The method according to claim 9,
wherein a first part of the configuration for transmission of the second sidelink control information is defined by the first sidelink control information and a second part of the configuration for transmission of the second sidelink control information is defined by the assistance information.

12. The method according to claim 9,
wherein the configuration for transmission of the second sidelink control information defines radio resources forming one of a search space for transmission of the second sidelink control information and/or multiple search spaces for transmission of the second sidelink control information and a priority order of the multiple search spaces.

13. A radio device for a wireless communication network, the radio device comprising:
a processor; and
a memory coupled with the processor, the memory containing instructions executable by the processor whereby the radio device is operative to:
receive first sidelink control information from a further radio device;
based on assistance information stored in the radio device and the received first sidelink control information, determine a configuration for transmission of second sidelink control information;
based on the determined configuration for transmission of the second sidelink control information, receive the second sidelink control information from the further radio device; and
based on the received second sidelink control information, receive a sidelink radio transmission from the further radio device.

14. The radio device according to claim 13,
wherein the assistance information defines multiple candidate configurations for transmission of the second sidelink control information; and
wherein the first sidelink control information identifies the configuration for transmission of the second sidelink control information among the candidate configurations.

15. The radio device according to claim 13,
wherein the configuration for transmission of the second sidelink control information defines radio resources forming one of a search space for transmission of the second sidelink control information and/or multiple search spaces for transmission of the second sidelink control information and a priority order of the multiple search spaces.

16. The radio device according to claim 13, whereby the radio device is further operative to receive and store at least part of the assistance information,
from a node of the wireless communication network,
in response to the radio device entering a service area of the node,
from the further radio device, and/or
from the further radio device in response to the radio device entering a radio coverage area of the further radio device.

17. A radio device for a wireless communication network, the radio device comprising:
a processor; and
a memory coupled with the processor, the memory containing instructions executable by the processor whereby the radio device is operative to:
based on assistance information stored in the radio device, determine first sidelink control information, the assistance information relating the first sidelink control information to a configuration for transmission of second sidelink control information;
send the first sidelink control information to a further radio device;
based on the configuration, send the second sidelink control information to the further radio device; and
based on the second sidelink control information, send a sidelink radio transmission to the further radio device.

18. The radio device according to claim 17,
wherein the assistance information defines multiple candidate configurations for transmission of the second sidelink control information; and
wherein the first sidelink control information identifies the configuration for transmission of the second sidelink control information among the candidate configurations.

19. The radio device according to claim 17,
wherein the configuration for transmission of the second sidelink control information defines radio resources forming one of a search space for transmission of the second sidelink control information and/or multiple search spaces for transmission of the second sidelink control information and a priority order of the multiple search spaces.

20. The radio device according to claim 17, wherein the radio device is further operative to receive and store at least a part of the assistance information,
from a node of the wireless communication network, in response to the radio device entering a service area of the node,
from the further radio device, and/or
from the further radio device in response to the radio device entering a radio coverage area of the further radio device.

21. A node for a wireless communication network, the node comprising:
a processor; and
a memory coupled with the processor, the memory containing instructions executable by the processor whereby the radio device is operative to:
provide assistance information to a first radio device; and
provide the assistance information to a second radio device,
the assistance information relating first sidelink control information, that was transmitted from the first radio device to the second radio device, to a configuration for transmission of second sidelink control information from the first radio device to the second radio device.

22. The node according to claim 21,
wherein the assistance information defines multiple candidate configurations for transmission of the second sidelink control information; and
wherein the first sidelink control information identifies the configuration for transmission of the second sidelink control information among the candidate configurations.

23. The node according to claim 21, wherein the node is further operative to send the assistance information:
in response to the first radio device and/or the second radio device entering a service area of the node
in response to a request from the first radio device and/or a request from the second radio device
via the first radio device to the second radio device, and/or
via the second radio device to the first radio device.

24. A computer program product comprising a non-transitory computer readable medium having program code to be executed by at least one processor of a radio device, whereby execution of the program code causes the radio device to perform a method according to claim 1.

25. A computer program product comprising a non-transitory computer readable medium having program code to be executed by at least one processor of a node of a wireless communication network, whereby execution of the program code causes the node to perform a method according to claim 9.

26. A computer program product comprising a non-transitory computer readable medium having program code to be executed by at least one processor of a radio device, whereby execution of the program code causes the radio device to perform a method according to claim 5.

* * * * *

UNITED STATES PATENT AND TRADEMARK OFFICE
CERTIFICATE OF CORRECTION

PATENT NO. : 11,290,983 B2
APPLICATION NO. : 16/080311
DATED : March 29, 2022
INVENTOR(S) : Ashraf et al.

It is certified that error appears in the above-identified patent and that said Letters Patent is hereby corrected as shown below:

In the Specification

In Column 1, Lines 34-35, delete "V2X (vehicle-to-anything)" and insert -- V2X (vehicle-to-everything) --, therefor.

In Column 6, Line 58, delete "comprise" and insert -- comprises --, therefor.

In Column 7, Line 19, delete "specified" and insert -- specified in --, therefor.

In Column 7, Line 54, delete "dame" and insert -- same --, therefor.

In Column 8, Line 9, delete "involve" and insert -- involves --, therefor.

In Column 10, Line 38, delete "send" and insert -- sent --, therefor.

In Column 11, Line 7, delete "send" and insert -- sent --, therefor.

In Column 11, Line 20, delete "sending UE 30." and insert -- sending UE 20. --, therefor.

In Column 12, Line 9, delete "the, the" and insert -- the --, therefor.

In Column 12, Line 18, delete "it further" and insert -- it is further --, therefor.

In Column 12, Lines 22-23, delete "receiving UE 20" and insert -- receiving UE 30 --, therefor.

In Column 12, Line 24, delete "receiving UE 20" and insert -- receiving UE 30 --, therefor.

In Column 12, Line 25, delete "the, the" and insert -- the --, therefor.

In Column 12, Line 27, delete "sending UE 20." and insert -- receiving UE 30. --, therefor.

Signed and Sealed this
Sixth Day of September, 2022

Katherine Kelly Vidal
*Director of the United States Patent and Trademark Office*

CERTIFICATE OF CORRECTION (continued)

U.S. Pat. No. 11,290,983 B2

In Column 12, Line 27, delete "receiving UE 20" and insert -- receiving UE 30 --, therefor.

In Column 12, Line 29, delete "receiving UE 20," and insert -- receiving UE 30, --, therefor.

In Column 12, Lines 29-30, delete "sending UE 20" and insert -- receiving UE 30 --, therefor.

In Column 12, Line 30, delete "assistance information 402" and insert -- assistance information 404 --, therefor.

In Column 12, Lines 38-39, delete "service area 100 and one" and insert -- service area 101 --, therefor.

In Column 13, Line 47, delete "used" and insert -- used for --, therefor.

In Column 14, Line 33, delete "could" and insert -- could be --, therefor.

In Column 14, Line 51, delete "e.g.," and insert -- (e.g., --, therefor.

In Column 15, Line 51, delete "the selected" and insert -- selected --, therefor.

In Column 15, Line 61, delete "e.g.," and insert -- E.g., --, therefor.

In Column 18, Line 3, delete "an modulation" and insert -- a modulation --, therefor.

In Column 20, Line 38, delete "an modulation" and insert -- a modulation --, therefor.

In Column 20, Line 51, delete "receives" and insert -- sends --, therefor.

In Column 22, Line 60, delete "an modulation" and insert -- a modulation --, therefor.

In Column 23, Line 17, delete "radio device 1100" and insert -- node 1100 --, therefor.

In Column 24, Line 43, delete "access interface 1300" and insert -- access interface 1310 --, therefor.

In Column 25, Line 47, delete "Embodiment 1" and insert -- Embodiment 1: --, therefor.

In the Claims

In Column 42, Line 26, in Claim 24, delete "a method" and insert -- the method --, therefor.

In Column 42, Line 31, in Claim 25, delete "a method" and insert -- the method --, therefor.

In Column 42, Line 38, in Claim 26, delete "a method" and insert -- the method --, therefor.